US006988262B1

(12) United States Patent
Mallory et al.

(10) Patent No.: US 6,988,262 B1
(45) Date of Patent: *Jan. 17, 2006

(54) CONTROLLED EXECUTION OF PARTITIONED CODE

(75) Inventors: James Mallory, Menlo Park, CA (US); Sunil Bhargava, San Carlos, CA (US); Shirish Puranik, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/501,353

(22) Filed: Feb. 9, 2000

Related U.S. Application Data

(63) Continuation of application No. 08/810,624, filed on Feb. 28, 1997, now Pat. No. 6,126,328.

(51) Int. Cl.
G06F 9/44 (2006.01)

(52) U.S. Cl. .................. 717/127; 717/131; 719/330
(58) Field of Classification Search ......... 717/124–135; 719/330
See application file for complete search history.

(56) References Cited

U.S. PATENT DOCUMENTS

| 5,247,676 A | | 9/1993 | Ozur et al. .................. 395/684 |
|---|---|---|---|
| 5,371,746 A | | 12/1994 | Yamashita et al. .......... 395/682 |
| 5,430,876 A | | 7/1995 | Schreiber et al. ........... 395/682 |
| 5,457,797 A | * | 10/1995 | Butterworth et al. .......... 717/4 |
| 5,787,245 A | | 7/1998 | You et al. ............... 395/183.14 |
| 5,794,047 A | | 8/1998 | Meier .......................... 395/704 |
| 5,802,371 A | | 9/1998 | Meier .......................... 395/704 |
| 5,818,445 A | * | 10/1998 | Sanderson et al. .......... 345/334 |
| 6,126,328 A | * | 10/2000 | Mallory et al. ................ 717/4 |

OTHER PUBLICATIONS

Meyer et al., "Design and Test Strategies for a Safety–Critical Embedded Executive", ACM, pp.29–27, Dec. 1996.*
Behrends, "Simulation–based Debugging of Active Databases", IEEE, pp. 172–180, Feb. 1994.*
"MicrosoftC/C+++ Environment and Tools", pp. 393–398, Microsoft Corporation, 1991.
Klaus–Peter Lohr, et al., "DAPHNE–Support for Distributed Applications Programming in Heterogeneous Computer Networks", IEEE, pp 63–71.
Antonio Corradi, et al., "Error Recovery Mechanisms For Remote Procedure Call–Based Systems", IEEE, pp. 502–507.

* cited by examiner

Primary Examiner—John Chavis
(74) Attorney, Agent, or Firm—Craig G. Holmes; Hickman Palermo Truong & Becker LLP

(57) ABSTRACT

An execution engine embeddable in a plurality of host application programs to control execution of code in each of the host application programs is disclosed. The execution unit includes a command unit, an execution unit and a host call unit. The command unit receives commands from a host application program in which the execution engine is embedded, including a command to execute a sequence of platform-independent instructions. The execution unit executes the sequence of platform-independent instructions until an instruction indicating either a break event or a remote procedure call is detected. The host call unit initiates execution of one or more procedures in the host application program in response to the execution unit detecting the instruction indicating a break event or a remote procedure call.

76 Claims, 17 Drawing Sheets

CONTROLLED EXECUTION OF PARTITIONED CODE

This is a continuation of U.S. Non-provisional patent application Ser. No. 08/810,624, filed on Feb. 28, 1997 and issued as U.S. Pat. No. 6,126,328 on Oct. 3, 2000.

BACKGROUND OF THE INVENTION (1) Field of the Invention

The present invention relates to the field of computer software development. More specifically, the present invention relates to a method and apparatus for controlling execution of a distributed computer application program.

(2) Art Background

Tools for debugging and profiling computer programs have become essential to the development of modern software applications. Debuggers facilitate error detection and correction, performance profilers generate timing profiles illustrating the location of execution bottlenecks and tracing tools generate histograms indicating the number of executions of a program's various procedures and the number of traversals of branches within the procedures.

Each of these tools have a common characteristic. They require code execution to be stopped or interrupted at certain points so that execution information can be gathered. A performance profiler, for example, might require a stop at the entry and exit of each procedure so that the time required for the procedure to be executed can be measured in a stopwatch-like fashion. In a tracing tool, a stop at the entry to each procedure might be required so that the tool can record the entry in a histogram. In a debugger, a user may specify certain break events, the detection of which is to result in halting (breaking) execution of the code being debugged. After execution breaks, the debugger user can examine execution information such as stack, variable and machine data. Since the ability to control the starting and stopping of code execution is fundamental to each of these software development tools, they are referred to collectively herein as controlled-execution tools.

For most computer programs, tools designed to control execution of program code in a single process are adequate. More and more modern applications, however, involve multiple local processes, multiple threads or multiple processes distributed across multiple machines. Such applications are said to be partitioned. In partitioned applications, debuggers and profilers directed to managing and examining the execution of a single process are often inadequate to meet a software developer's needs.

To illustrate the limitation of a single-process program development tool, consider a multiprocess database application. One process, a client process, might be developed to interact with a database user. The client process might display predesigned data-entry forms for receiving data input, receive query commands from the user instructing the client process to obtain information of interest, and perform numerous other user-interface operations. Another process, a server process, may act as gatekeeper to the data store itself. The server might receive requests from the client process and, in response, write to or read from the data store. Of course, the server might support multiple clients and provide other functions as well, such as maintaining data integrity, providing system security and optimizing database availability. One way in which the client process might communicate database query and update requests to the server process is via remote procedure calls. That is, procedure calls made by the client application requiring execution by the server application.

Consider what happens when a single-process debugger is used to debug a program containing a remote procedure call. At any time before the remote procedure call is made by the local process, breakpoints may be reached and execution information pertaining to the local process examined. After the remote procedure call is made, however, the execution of interest occurs in a remote process; a process over which the single-process debugger has no control. Until the remote procedure call is completed, the debugger, and therefore the software developer, is running blind. Execution of the remote procedure may not be halted at points of interest and execution information resulting from execution of the remote procedure may not be examined. Single process code coverage and performance profiling tools, which also require controlled execution, exhibit similar shortcomings in a multiprocess or distributed process environment.

One way in which software developers have attempted address this problem is to concurrently execute software development tools on each of the processes, caller and recipient, involved in the remote procedure call under test. This can be cumbersome, however, especially when the two processes under test are operating on separate machines. Furthermore, in some cases the recipient process is either created or awakened (e.g., from a suspended state) in response to the remote procedure call. In such cases it is difficult to launch or resume the process under test and launch a software development tool on that process simultaneously.

It is desirable, therefore, to provide a method for controlling execution of partitioned code without requiring separate development tools to be executed in each partition. Furthermore, it is desirable to make the partition transparent so that the development tool user is relieved from having to know where, or in what process, the code being evaluated is located. Finally, it is desirable to permit controlled execution of code residing in heterogeneous operating environments by removing machine and operating system dependent characteristics from the execution information being presented to the user.

SUMMARY OF THE INVENTION

An apparatus and method for controlling execution of partitioned code are disclosed. The apparatus is an embeddable execution engine having a command unit for receiving a command indicating a sequence of instructions to be executed, an execution unit for executing the indicated sequence of instructions and a host call unit. In controlled-execution mode, the execution unit executes instructions until an instruction indicating a break event or a remote procedure call is detected. In response to detecting the instruction indicating a break event or a remote procedure call, the host call unit initiates execution of one or more call-back procedures provided in a host application program in which the execution engine is embedded. The host application program call-back procedure is executed to initiate execution of a remote host application program, also having an embedded execution engine according to the present invention, to execute a remote sequence of instructions in its embedded execution engine. The host application program call-back procedure then communicates with a manager process to effectuate an input/output interface to the remote host application program. A computer-user interacts with the host call-back procedure through a single user-interface to set or remove break events and to query execution information in both host application programs, thus achieving controlled execution of partitioned program code.

BRIEF DESCRIPTION OF THE DRAWING

The features and advantages of the present invention will be more fully understood by reference to the accompanying drawing, in which.

DETAILED DESCRIPTION OF THE INVENTION

Figure 1:
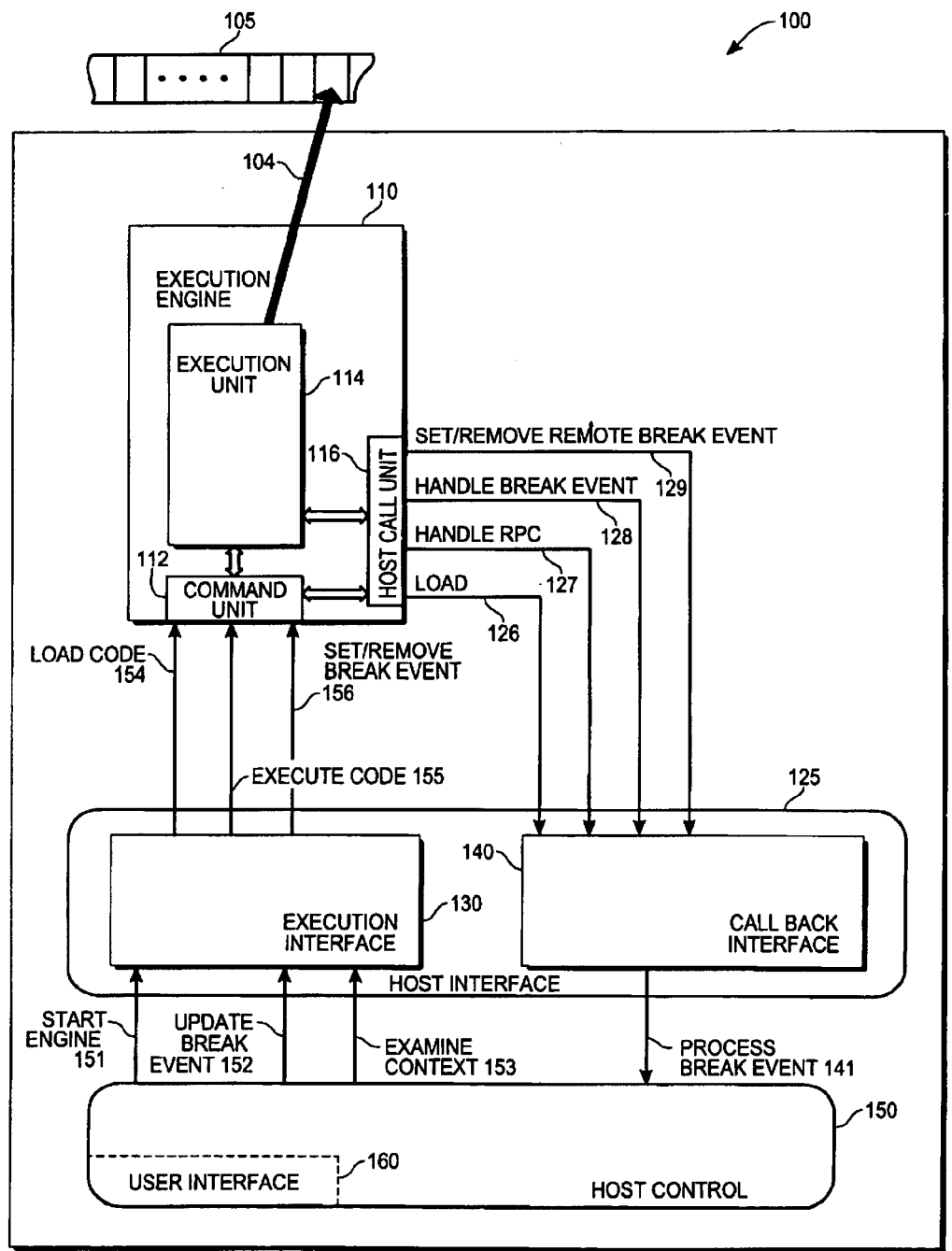
FIG. 1 is a diagram illustrating a host application program including an embedded execution engine.

A method and apparatus for controlled execution of partitioned code is described below. Although numerous specific details are set forth in order to provide a thorough understanding of the present invention, it will be apparent to one skilled in the art that the present invention may be practiced without such specific details. For example, an execution engine according to the present invention may be implemented in hard-wired circuitry, by programming a general purpose processor or by any combination of hardware and software. Since significant advantages arise when the execution engine is embedded in a host software application, however, the execution engine is described primarily in terms of a software implementation.

Terminology

The terms "process", "thread", "application program", "partition", "procedure", and "remote procedure call" appear throughout the following description of the present invention and it is helpful to establish their meanings here.

A process is an instance of an executing computer program having an independent code and data space. A thread is an instance of an executing computer program sharing code and data space with another execution of the same computer program. A machine concurrently executing multiple threads or multiple processes is a multiprocessing (or multi-tasking) machine.

An application program is a sequence of instructions which, when executed by a processor, carry out a particular function intended by the user of the application program. In most cases an application program will include sequences of instructions which, when executed, invoke services of an operating system. The application program is said to be mounted on the operating system and to be executing in an environment established by the operating system. An application program may involve execution of multiple processes (a multiprocessing application), multiple threads (a multi-threaded application), or both.

The term "partition" denotes the division of an application program into two or more processes. A multiprocessing application is partitioned into two or more processes with each process representing a partition of the application. The code executed in a multiprocessing application is also said to be partitioned since it is executed by more than one process.

As used herein, the term "procedure" refers to a sequence of instructions ending in a return to a caller. Functions and subroutines, for example, are procedures, as is the main routine of a program which is invoked by and returns to an operating system.

Herein, the expression "remote procedure call" (RPC) refers to a communication from a calling process to a recipient process requesting the recipient process to execute a sequence of instructions. While a given remote procedure call implementation may require a specific messaging protocol or data set to be used, no such limitation is intended herein.

Finally, it is common parlance in the computer science field to speak of software, in one form or another (e.g., program, procedure, application . . . ), taking an action or causing a result. Such expressions, which occasionally appear herein, are merely a shorthand way of saying that execution of the software by a machine results in an action being taken or a result being caused.

Execution of a Host Application Program in a Local Process

FIG. 1 is a diagram 100 of a host application program 102 including an execution engine 110, a host interface 125 and a host control 150. In the preferred embodiment of the present invention, the execution engine 110 is a language subsystem for interpreting platform-independent code into instructions that be executed by a specific processor. Also in the preferred embodiment, the execution engine 110 is compiled to obtain an execution engine object that can be "embedded" in a number of different application programs through static or dynamic linking. Examples of application programs in which the execution engine can be embedded, referred to as "host application programs", include Internet browsers, database related programs, or any other computer programs that may need to execute code with a language subsystem.

In one embodiment of the present invention, the execution engine 110 includes an execution unit 114, a command unit 112 and a host call unit 116. The command unit 112 is a programmatic interface defined by a number of execution engine procedures that can be called by a host application program. The execution unit 114 is the portion of execution engine 110 responsible for fetching and interpreting platform-independent byte codes. It will be appreciated that the execution engine could execute other types of code. In the preferred embodiment, the execution unit is implemented by execution of program code by a processor. The host call unit 116 is defined by a set of procedure calls issued to procedures in the host interface 125 upon detecting certain events in the execution unit 114 and upon receiving certain host requests in the command unit 112.

Program code in host control 150 determines the overall function of the application program 102. Host control 150 may include user-interface code 160 to implement a user-interface, or may include program code which, after execution is started, requires no further user-input. For example, to implement a debugger application, host control 150 would include program code to prompt a computer-user to identify the code module to be executed by the embedded execution engine 110, code to prompt the user to set and remove break events, code to prompt the user to specify execution information to be displayed for user examination, code to display the execution information, and so on. Alternatively, to implement a tracing tool or a performance profiler, host control 150 would include code to prompt the user to identify the code module to be traced or profiled, code to automatically specify breakpoints (e.g., at the entry and exit points of the code to be traced/profiled) and code to log information pertaining to break events in a data record such as a flat file or relational database.

The host interface 125 includes two sets of procedures used to provide an interface between host control 150 and execution engine 110. One set of procedures is provided in the execution interface 130, the other set is provided in the call-back interface 140. The execution interface 130 includes procedures called by execution of host control code to manage the operation of execution engine 110. The call-back interface 140 includes procedures called by execution engine 110 in response to detecting an event requiring attention by either a local or remote host control. Such events include initial invocation of the execution engine 110 (i.e., execution engine 110 startup), detection of a break event, detection of a remote procedure call, and receipt of a request to set or remove a break event pertaining to a module not being executed in the execution engine 110.

It will be appreciated that by defining execution engine 110 in terms of execution engine procedures that can be called and procedures called by the execution engine 110 itself, a software implementation of execution engine 110 represents an application programming interface (API) that can be utilized by an application programmer to realize the benefits of controlled execution without having to know the details of how execution engine 110 operates. By adding the ability of execution engine 110 to detect remove calls and in effect request controlled execution of remote code, a synergy results which allows controlled execution of partitioned code through a single interface.

If written in a programming language conforming to a recognized standard, sequences of instructions designed to implement execution engine 110 can be compiled for execution on a variety of hardware platforms and for interface to a variety of operating systems. Herein, the expression "operating environment" is used to denote a particular hardware platform and operating system used to execute an application program. As will be discussed more fully below, by embedding execution engine 110 in multiple host application programs that have been compiled for execution in heterogeneous operating environments (i.e., differing hardware platforms, operating systems or both), controlled execution of code partitioned across heterogeneous operating environments can be achieved.

In FIG. 1, each of the single-line arrows extending between the execution engine 110 and the host interface 125, and between the host interface 125 and the host control 150 represent procedure calls. The direction of the arrow indicates the direction of the procedure call. For example, arrow 141 extends from the call-back interface 140 in the host interface 125 to the host control 150, and is labeled ProcessBreakEvent. Thus, arrow 141 indicates that the call-back interface includes a call to a host control procedure called ProcessBreakEvent. The bold arrow 104 extending from the execution engine to a code module 105 (representing a sequence of instructions) indicates a fetch operation used to obtain an instruction from code module 105 for interpretation by the execution engine 110. The double-headed arrows extending between the command unit 112, execution unit 114 and host call unit 116 indicate the functional interconnection between those units.

Controlled Execution of Code in Host Application 102

Controlled execution of code module 105 is described below in terms of procedure calls issued between the functional elements of host application program 102 (i.e., execution engine 110, host interface 125 and host control 150). The code module 105 includes the sequence of instructions to be executed by the execution engine, and, for the purpose focusing the following description, the host control code is assumed to implement a user-interactive debugging application. It will be readily appreciated that other application programs requiring controlled-execution of code could also be developed using the method of the present invention.

Referring still to FIG. 1, controlled code execution begins when a computer-user starts host application program 102 and indicates that code module 105 is to be executed in a controlled mode. In one embodiment of the present invention, this is accomplished by executing a host control procedure called "Launch" in response to user action, passing a value identifying code module 105 as an input parameter. When executed, host control procedure Launch calls procedure StartEngine (as indicated by arrow 151) in the execution interface 130, supplying the code module 105 identifier. Procedure StartEngine first instantiates (allocates storage and initializes) a data structure referred to herein as an "execution context". Once instantiated, the execution context is referenced by procedures in the execution interface 130 and by procedures in the execution engine 110 throughout execution of code module 105.

Figure 20:
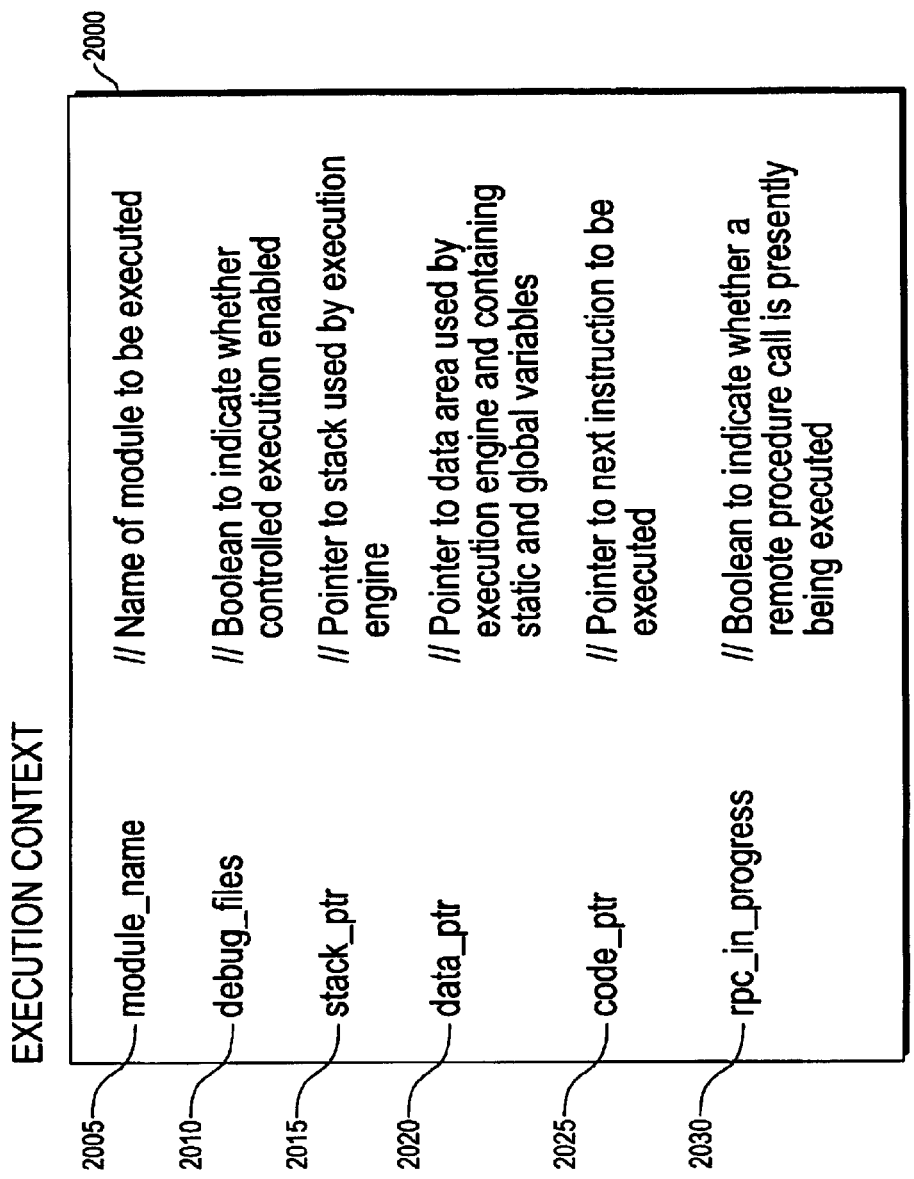
FIG. 20 illustrates an execution context data structure.

FIG. 20 depicts an execution context data structure 2000 according to one embodiment of the present invention. As shown, an execution context data structure includes a number of members, including module_name 2005, the name or other identifier of the code module to be executed by the execution engine; debug_flag 2010, a Boolean value to indicate whether execution of the code module is to be controlled or free-running; stack_ptr 2015, a pointer to the stack used by the execution engine; data_ptr 2020, a pointer to storage allocated for static and global variables referenced by the execution engine during execution of the code module 105; code_ptr 2025, a pointer to the next instruction in code module 105 to be executed; and rpc_in_progress

2035, a flag to indicate that execution of local code module 105 has paused pending return from a remote procedure call.

After the execution context data structure has been instantiated, procedure StartEngine calls procedure Load-Code in the execution engine 110 as indicated by arrow 154. Procedure LoadCode is executed to instantiate a break event data structure referred to as a "break event list". The break event list is used to record host control specified break events. After the break event list has been instantiated, execution of procedure LoadCode results in a call to procedure Load in the call-back interface 140. This is indicated by arrow 126. call-back interface procedure, Load, is executed to load the sequence of instructions constituting code module 105 into the computer system's core memory at a given address, and then to return the address (i.e., a pointer to code module 105) to procedure LoadCode in the execution engine 110.

After the code module 105 has been loaded into core memory and the pointer to the code module received in the execution engine 110, procedure LoadCode returns to its caller, StartEngine, in the execution interface 130. Execution of StartEngine resumes, resulting in a call to execution engine procedure ExecuteCode (indicated by arrow 155) to execute code module 105. As will be discussed in greater detail below, a pointer to the previously instantiated context data structure is passed into procedure ExecuteCode to indicate whether the execution engine is to operate in controlled-execution mode or free-running mode.

If code module 105 is to be executed in free running mode, procedure ExecuteCode executes code module 105 to completion, without detecting or stopping at break events. If, on the other hand, code module 105 is to be executed in controlled-execution mode, procedure ExecuteCode executes code module 105, stopping to call a procedure in the call-back interface upon detecting any of the following conditions: initial invocation of ExecuteCode, a break event, or a remote procedure call.

Upon initial invocation of procedure ExecuteCode, and when a break event is detected during execution of procedure ExecuteCode, call-back interface procedure Handle-BreakEvent is called (as indicated by arrow 128) and passed a parameter indicating the nature of the break event. Procedure HandleBreakEvent is executed to call host control procedure ProcessBreakEvent (indicated by arrow 141), forwarding the break event parameter. Depending on its implementation, procedure ProcessBreakEvent may display the break event to the user or may log the break event in a data record for later analysis. Procedure ProcessBreakEvent is then executed to prompt the user to set or remove a break event, or to query execution information resulting from execution of code module 105.

If the user enters a command to query execution information pertaining to execution of code module 105, host control code is executed to call execution interface procedure ExamineContext, supplying the name of the code module of interest and the execution information sought. This call is indicated by arrow 153. Procedure Examine-Context is executed to identify the context data structure corresponding to the indicated code module, and then to retrieve the requested execution information by referencing the context data structure. The execution information is then returned to the requesting host control code, which displays the data in a user-interface and returns to procedure ProcessBreakEvent.

It will be appreciated that since execution of code module 105 may be paused at an execution point that is multiple subroutine-calls deep, the host interface may need to communicate to the execution interface which subroutine call is the subroutine call of interest. In one embodiment of the present invention, this is accomplished by passing an additional parameter to procedure ExamineContext to indicate the subroutine call of interest. For example, parameter=1 indicates the original routine for which the execution engine was started, parameter=2 indicates a subroutine called by the original routine, parameter=3 indicates a subroutine called by the subroutine called by the original routine, and so on. Procedure ExamineContext uses this additional parameter to identify the execution context structure corresponding to the subroutine of interest. Also, a zero-valued parameter may be used to indicate that the currently executing subroutine is the subroutine of interest, no matter how many subroutine calls deep. Other specially valued parameters can then be used to navigate up and down the call-stack relative to the present indicated subroutine of interest.

As stated above, procedure ProcessBreakEvent prompts the user to enter a break event or break events pertaining to code module 105. Once the user enters a break event to be set or removed, execution interface procedure Update-BreakEvent is called, as indicated by arrow 152, and receives information indicating the break event to be set or removed as a passed parameter. Procedure Update-BreakEvent is executed to call execution engine procedure Set/RemoveBreakEvent (indicated by arrow 156), indicating the break event to set or remove in an input parameter.

The execution engine procedure, Set/RemoveBreakEvent, is executed to confirm that the break information pertains to code module 105, and not to code being executed remotely in response to a previously encountered remote procedure call. Procedure Set/RemoveBreakEvent is then executed to install the indicated break event (or events) in the previously instantiated break event list. It will be appreciated that break events can be removed from the break event list in a similar manner. After the break event list has been updated, procedure Set/RemoveBreakEvent is exited, returning to execution interface procedure UpdateBreakEvent, which returns to host control procedure ProcessBreakEvent, which returns to call-back interface procedure HandleBreakEvent, which returns to execution engine procedure ExecuteCode.

As an aside, a procedure call is typically accomplished by the calling procedure pushing the address of an instruction following the call instruction onto the stack (along with other values such as a pointer to the top of the stack at the time of the call, parameter values, etc.), then branching to the starting address of the called procedure indicated by the call instruction. When the called procedure is exited, the address of the next instruction to be executed in the caller is popped from the stack into an instruction pointer register in the processor and execution of the caller is resumed. The net effect of a call followed by a return is to wind (push data onto) the stack, then unwind (pop data off) the stack. Consequently, the return from procedure Set/RemoveBreakEvent to procedure UpdateBreakEvent to procedure ProcessBreakEvent to procedure HandleBreakEvent to procedure Execute Code is referred to as "unwinding" from procedure Set/RemoveBreakEvent to procedure ExecuteCode. When procedure HandleBreakEvent returns to execution engine procedure ExecuteCode, execution of code module 105 resumes (or, at an invocation break, commences) at the next pointed to instruction.

In an alternative embodiment of the present invention, rather than automatically unwinding the stack to resume execution of procedure ExecuteCode after a break event has been set or removed, the stack is unwound to procedure ProcessBreakEvent where the user is prompted to either set or remove another break event or to resume execution of code module 105. In this alternative embodiment, one break event is set or removed in each call to procedure Set/ RemoveBreakEvent, and an additional procedure may be provided to cause execution of code module 105 to be resumed.

Execution of an instruction in the execution unit 114 of execution engine 110 occurs in two phases. First, the next instruction in code module 105 is fetched, then the instruction is interpreted for execution by computer hardware. If execution of code module 105 is to occur in controlled-execution mode, prior to the execution of each fetched instruction, the instruction is evaluated to determine if it indicates a break event recorded in the previously instantiated break event list. This action is referred to as "event detection". If the instruction indicates a break event, procedure HandleBreakEvent is called again, and receives information indicating the break event as an input parameter. The operation of procedure HandleBreakEvent is as described above.

If an instruction indicating a remote procedure call is detected while the execution engine 110 is operating in either controlled-execution mode or free-running mode, the rpc_in_progress flag in the execution context structure is set to indicate the remote procedure call (see FIG. 20, element 2030). Then, call-back interface procedure HandleRPC is called (indicated by arrow 127), receiving as input parameters the name of the code module to be executed in the remote process and a flag indicating whether the execution engine is operating in controlled-execution mode. If the execution engine is operating in free-running mode, the remote procedure call is made to the remote process and execution of host application 102 is suspended until the remote procedure call returns. In the remote process, the remote procedure call acts to initiate execution of the indicated code module in the execution engine of the remote host application as though a user had directly requested the operation. When code execution in the host has completed, the remote procedure call returns. It will be appreciated that, for one debugging (or tracing or performance profiling) the local host application program, the remote procedure call represents a barrier beyond which the local debugger cannot operate.

Controlling Execution of code in Local and Remote Processes

Figure 2:
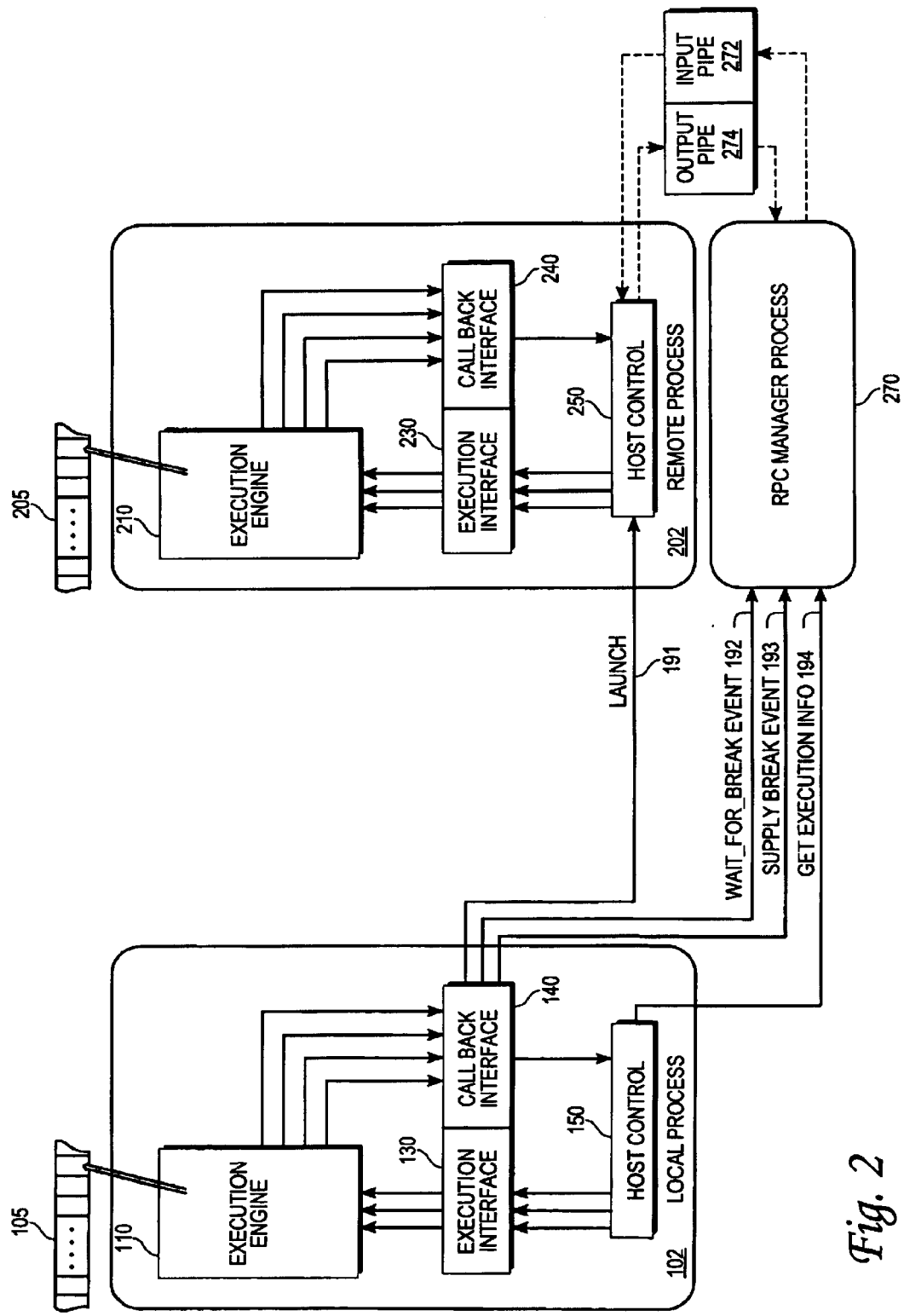
FIG. 2 is a diagram illustrating a local host application program and a remote host application program, each including an embedded execution engine.

FIG. 2 illustrates an embodiment of the present invention that overcomes the controlled-execution barrier presented by remote procedure calls. The execution engine 110, execution interface, 130, call-back interface 140 and host control 150 of host application program 102 include the functionality discussed above. Host application program 202 includes the same functional elements as host application program 102, viz., execution engine 210, execution interface 230, call-back interface 240 and host control 250. To avoid confusion when referring to either of the host application programs (102 and 202) or the functional elements therein, host application program 202 and its functional elements are occasionally referred to as being "remote" (e.g., the remote host application program 202), and the host application program 102 and its functional elements are occasionally referred to as being "local". The terms remote and local are a matter of perspective and should not be taken to indicate any functional difference between host application program 102 and host application program 202.

Also shown in FIG. 2 is a RPC Manager process 270 (i.e., Remote Procedure Call Manager) and a pair of data pipes 272 and 274 indicated by dashed lines as intercoupling the RPC Manager process 270 and the host control 250 of the remote host application program 202. A data pipe is an area of memory accessible to two processes so that messages written into a data pipe by one process can be read out by the other. Data pipes are typically unidirectional so that, in one embodiment of the present invention, two data pipes (272 and 274) are provided to allow bidirectional communication between the RPC Manager process 270 and the remote host application program 202.

In one embodiment of the present invention, the RPC Manager process 270 is created by the operating system on which the remote host application is mounted. This may be accomplished by the local host application requesting creation of the RPC Manager process at startup or upon determining that controlled-execution of a remote procedure call is required. In the preferred embodiment of the present invention, the RPC Manager process is executed on the same machine as the remote host application program. Also, the RPC Manager includes code which, when executed, establishes data pipes 272 and 274 through which break events are communicated to and from the remote host application 202 and requests for execution information are communicated to the remote host application 202.

Returning to the scenario in which an instruction indicating a remote procedure call is detected in local execution engine 110, and in which call-back interface procedure HandleRPC has been invoked. If the execution engine 110 is operating in controlled-execution mode, then the indicated remote procedure call is issued by execution of HandleRPC, but as a non-blocking remote procedure call to a Launch procedure in the remote host control 250 (as indicated by arrow 191 if FIG. 2). That is, after making the remote procedure call 191, the local host application program 102 is not suspended and execution of HandleRPC is continued. As described below, the execution of remote host control procedure, Launch, causes the remote host control 250 to initiate controlled-execution of code module 205 in a manner similar to the way a user request caused local host control 150 to initiate execution of code module 105. As an aside, controlled-execution mode may be indicated to the remote host application 202 in a number of ways, including passing an additional parameter in the remote procedure call 191, or signaling controlled-execution mode from the RPC Manager process 270.

After the non-blocking remote procedure call 191 is issued, execution of procedure HandleRPC is continued to issue a second remote procedure call 192 to procedure WaitForBreakEvent in the RPC Manager process. RPC Manager procedure WaitForBreakEvent polls output data pipe 274 established between the RPC Manager and the remote host application program 202 until the remote host application program 202 indicates that a break event has been detected. As with execution engine 110 described above, the first break event detected in host application program 202 is the initial invocation of execution engine 210. Upon detecting the break event, the WaitForBreakEvent procedure in the RPC Manager process 270 is exited, returning an indication of the break event to its caller, i.e., local call-back interface procedure, HandleRPC. If the break event information returned by WaitForBreakEvent indicates that execution of remote code module 205 has completed, local call-back interface procedure HandleRPC is exited, returning to procedure ExecuteCode in the local execution engine 110. If the break event returned by WaitForBreakEvent does not indicate that execution of remote code module 205 has completed, HandleRPC is executed to call ProcessBreakEvent in local host control 150.

At the present point of execution, the remote break event indicates that the remote execution engine 210 has been invoked, so that local host control procedure Process-BreakEvent will be called from procedure HandleRPC. Assuming that local host control 150 implements a debugging application, ProcessBreakEvent is executed to indicate to a user that execution of code module 205 is poised to begin. When prompted, the user may supply information specifying break events to be detected during execution of remote code module 205.

It should be noted that the computer-user interacting with local host control 150 need not know that code module 205 is being executed in remote host application program 202. So long as the user has access to conventional source code list files pertaining to code module 205, the user can specify line numbers, instructions and other information pertaining to code module 205 as break events.

In one embodiment of the present invention, after the computer-user supplies break information to the ProcessBreakEvent procedure in the local host control 150, procedure UpdateBreakEvent in the local execution interface is called as described above in reference to FIG. 1. Procedure UpdateBreakEvent, in turn, calls local execution engine procedure Set/RemoveBreakEvent. Upon determining that the code module to which the break event corresponds is remote code module 205 (i.e., the code module indicated in the earlier encountered remote procedure call instruction), local call-back interface procedure Set/RemoveRemoteBreakEvent is called (see FIG. 1 arrow 129, also shown, but not enumerated,.in FIG. 2).

Local call-back interface procedure Set/RemoveRemoteBreakEvent receives the name of the remote module and the break event to set/remove, then issues a remote procedure call to RPC Manager procedure SupplyBreakEvent (indicated by arrow 193 of FIG. 2). Procedure SupplyBreakEvent writes the break information to input data pipe 272, then returns to the local call-back interface procedure Set/RemoveRemoteBreakEvent.

While the local host application program 102 has been executing to obtain break event information from the user, the remote application program has been looping in remote host control procedure ProcessBreakEvent waiting to receive a request to query execution information or to set or remove a break event in the input data pipe 272. Upon detecting the request to set or remove a break event in the input data pipe, remote execution interface procedure UpdateBreakEvent is called by remote host control procedure ProcessBreakEvent. Remote execution engine procedure Set/RemoveBreakEvent is then called to set or remove the indicated break event in the remote execution engine's break event list. Notice that the execution of the remote host application program 202 is as described above in regard to the local host application program 102, except the user-interface is replaced by data pipes 272 and 274. Thus, after the indicated break event update is effected, code execution in the remote host application program 202 unwinds from the execution engine 210 to the execution interface 230, from the execution interface 230 to the host control 250, from the host control 250 to the call-back Interface 240, and, finally, from the call-back interface 240 to the procedure ExecuteCode in the remote execution engine 210. Execution of remote execution engine procedure ExecuteCode is resumed to continue interpreting and executing instructions from code module 205.

As stated above, in an alternative embodiment of the present invention, the stack is not automatically unwound to procedure ExecuteCode after the indicated break event update has been effected. In this alternative embodiment, one break event is set or removed in each call to procedure Set/RemoveBreakEvent and an additional procedure may be called to cause execution of remote code module 205 to be resumed.

Focusing again on the operation of the local host application process, after RPC Manager process SupplyBreakEvent returns to local call-back interface procedure Set/RemoveRemoteBreakEvent, the call stack in the local host application program is unwound through the execution engine 110, the execution interface 130, the host control 150 and finally back to the local callback interface procedure HandleRPC. (Recall that HandleRPC had been executed to call ProcessBreakEvent in the local host control 150.) Execution of HandleRPC is now resumed and loops to issue another remote procedure call to the RPC Manager procedure WaitForBreakEvent. Procedure HandleRPC continues to successively call WaitForBreakEvent and ProcessBreakEvent until the event returned by WaitForBreakEvent indicates that execution of remote code module 205 is completed. At that point WaitForBreakEvent is exited, returning to its caller ExecuteCode in the local execution engine.

Recall that host control procedure ProcessBreakEvent allows a user to query execution information. One likely scenario is that after being called by procedure HandleRPC, procedure ProcessBreakEvent detects a user request to view execution information pertaining to execution of remote code module 205. In one embodiment of the present invention, local execution interface procedure ExamineContext is called and executed in the manner described above in reference to FIG. 1. When ExamineContext is unable to identify a context data structure corresponding to the remote process, it indicates this fact upon returning to procedure ProcessBreakEvent. ProcessBreakEvent then makes a remote procedure call to RPC Manager process 270 to invoke procedure GetExecInfo. This is indicated by arrow 194 of FIG. 2. (It will be appreciated that GetExecInfo could alternatively be invoked be by calling a procedure in the execution engine to call a call back interface procedure to issue the remote procedure call to procedure GetExecInfo.) Procedure GetExecInfo writes the module name and requested execution information to input data pipe 272, then polls output data pipe 274 to await response from the remote host control. After the remote host control has written the requested execution information to output data pipe 274, the data is returned to local host control procedure ProcessBreakEvent and displayed for the user.

In one embodiment of the present invention, when local execution interface procedure ExamineContext is called, an additional parameter is passed to indicate which subroutine of an existing local call-stack of subroutines is the subroutine of interest. (This additional parameter was discussed above in the context of controlled execution of local code.) Procedure ExamineContext determines the number of subroutines on the local call-stack. If the subroutine-indicating parameter is valued less than or equal to the number of subroutines on the local call-stack, procedure ExamineContext assumes that no remote procedure call is presently being executed and proceeds to locate a local execution context structure corresponding to the indicated subroutine. If, on the other hand, the subroutine-indicating parameter is valued greater than the number of subroutines on the local call-stack, procedure ExamineContext checks the execution context of the most recently called subroutine to make sure that a remote procedure call is presently being executed (e.g., by querying the rpc_in_progress flag discussed above in reference to FIG. 20). If so, the subroutine-indicating parameter is decremented by the number of subroutines on the local call-stack and returns this value to procedure ProcessBreakEvent along with information indicating that the requested execution information was not found locally. Procedure ProcessBreakEvent then makes a call to RPC Manager process 270 to invoke procedure GetExecInfo as described above. The now decremented subroutine-indicating parameter is passed to GetExecInfo communicated to the remote host interface where it is used in a call to the remote execution interface procedure ExamineContext.

In one embodiment of the present invention, when a zero-valued subroutine-indicating parameter is received in procedure ExamineContext, the execution context structure of the most recently invoked local subroutine is queried to determine if a remote procedure call is presently being executed. If so, the zero-valued subroutine-indicating parameter is returned to the caller along with information indicating that the requested execution information pertains to a remote procedure. Procedure GetExecInfo is then called and the subroutine-indicating parameter passed as discussed above.

It will be appreciated that, from the perspective of the remote host application program 202, reading data from the input data pipe 272 is essentially the same as reading data supplied via user-interface code. Likewise, from the perspective of the remote host application program 202, writing data to output data pipe 274 is essentially the same as writing data to a user-interface handler.

As described above, by embedding an execution engine having the ability to detect break events and remote procedure calls in a host application program, it becomes possible to control the execution of code in multiple partitions of a multiprocessing system from a single interface. It will be readily appreciated that the number of host application programs that could be controlled in this manner is not limited to two. Controlled execution of code in several host application programs could be accomplished by cascading the host application programs or by issuing remote procedure calls from a central host application program to a number of other host application programs in a hub and spoke arrangement. Moreover, the method of the present invention is not limited to local and remote processes executing on the same computer. Each of the different host application programs may be executed on a separate machine, and yet still be controlled from a single user-interface.

Procedure Descriptions

Having provided an operational description of local and remote host application programs including embedded execution engines according to the present invention, descriptions of the individual procedures implementing the host control, execution interface, call-back interface, execution engine and RPC Manager process are provided below. It will be appreciated that the list of procedures described is not an exhaustive list of procedures that would be desirable in an execution engine, host interface or host control.

Execution Engine Procedures

In the embodiment of the present invention described above, the embedded execution engine includes three procedures that can be called from the execution interface of the host application code: LoadCode, ExecuteCode and Set/RemoveBreakEvent. When executed by a processor, these procedures implement the command unit 112, execution unit 114 and host call unit 116 of execution engine 110 of FIG. 1.

Figure 3:
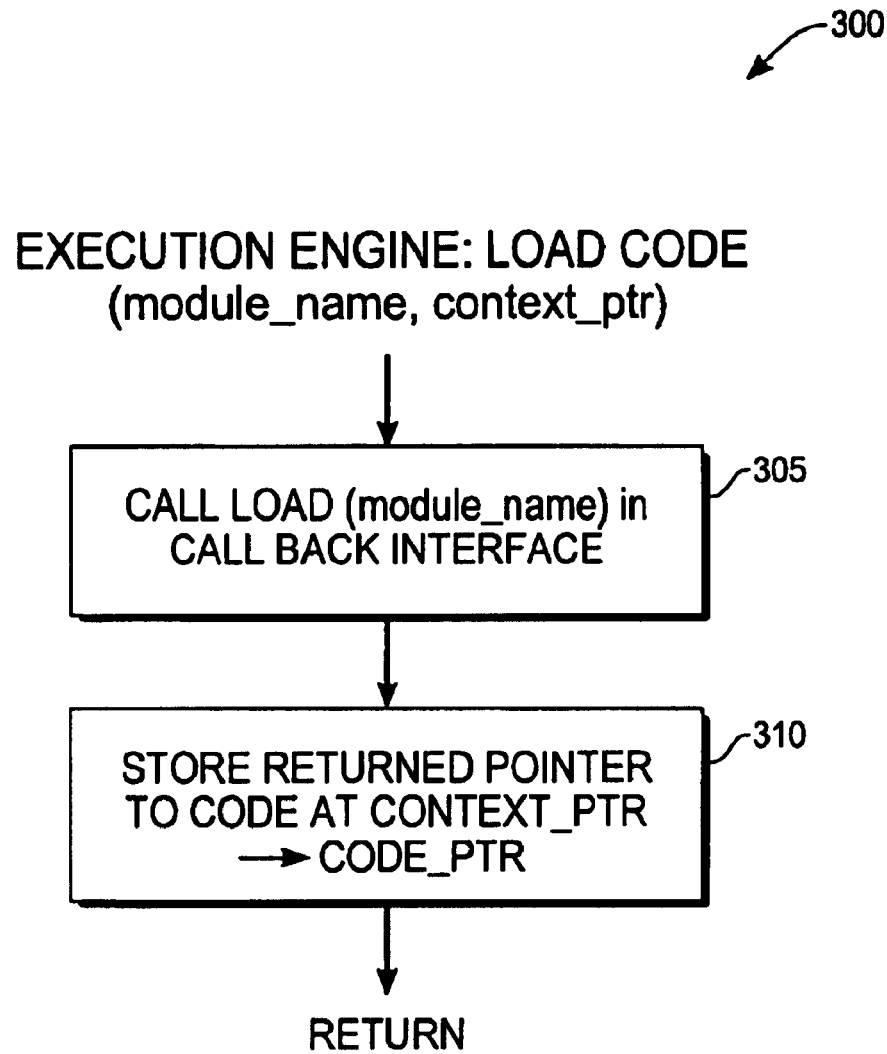
FIG. 3 is a flow diagram of execution engine procedure LoadCode

FIG. 3 is a flow diagram 300 of execution engine procedure LoadCode. As indicated, two parameters are passed to procedure LoadCode: the name of the code module to be executed (module_name) and a pointer to an execution context structure (context_ptr). At step 305, procedure Load in the call back interface is invoked. As discussed below, procedure Load receives the name of the module to be executed as an input parameter and returns a pointer to the first instruction of the module. At step 310 of procedure LoadCode, a pointer to the first instruction of the code module to be executed (i.e., code_ptr) is stored in the context structure context_ptr. Procedure LoadCode is then exited, returning to the caller in the execution interface. The call to procedure Load and a number of other calls to the call-back interface effectively implement the Host Call Unit of the embedded execution engine.

Figure 4:
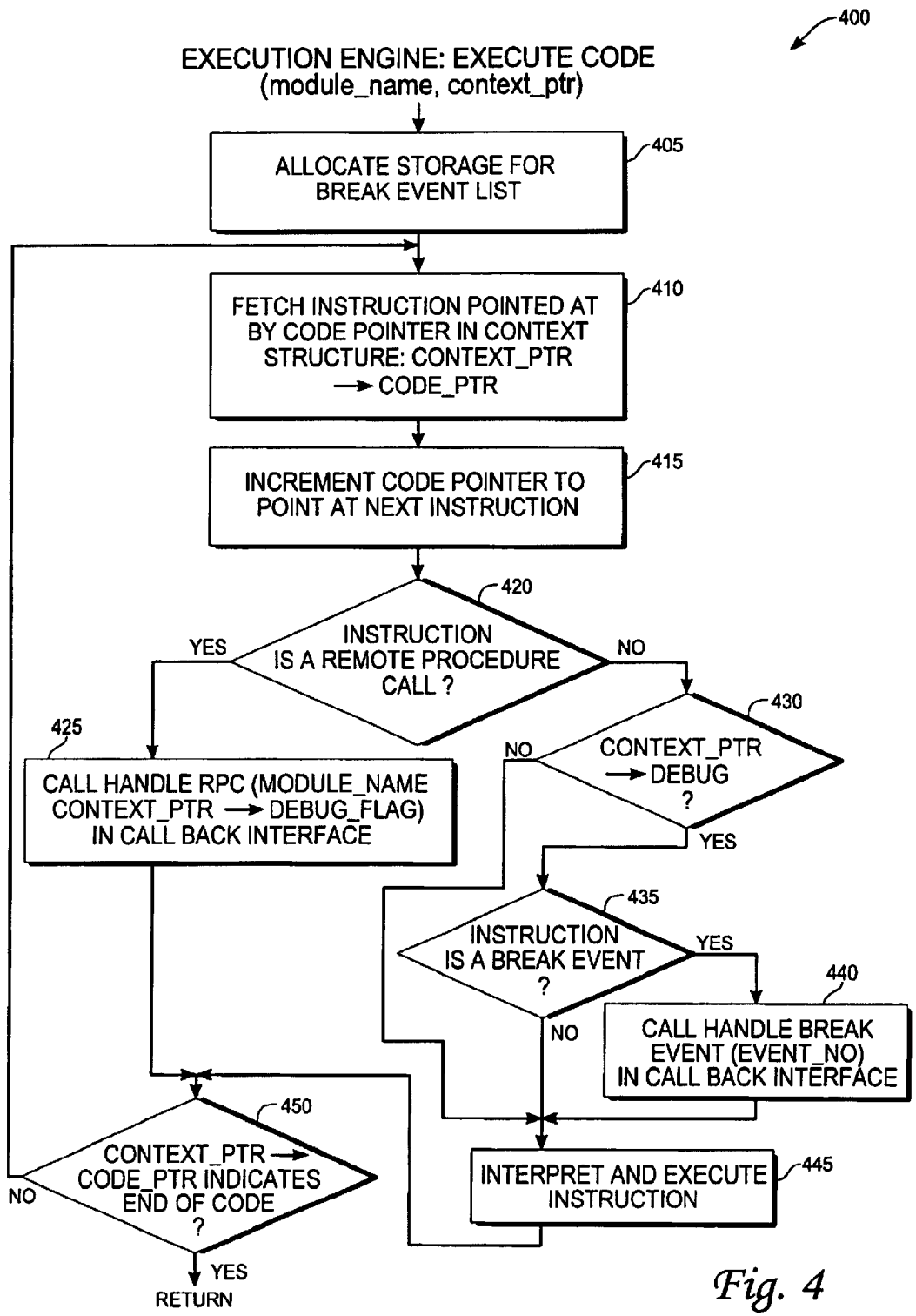
FIG. 4 is a flow diagram of execution engine procedure ExecuteCode.

FIG. 4 is a flow diagram 400 of execution engine procedure ExecuteCode. Procedure ExecuteCode receives the same two parameters as LoadCode discussed above, namely, the name of the code module to be executed (module_name) and a pointer to an execution context structure (context_ptr). At step 405, a data structure referred to as a "break event list" is instantiated (i.e., storage is allocated for the break event list and the data structure is initialized to a default state). In one embodiment of the present invention, break events are not specified until after the execution engine is initially invoked. Consequently, the break event list will contain no break events when procedure ExecuteCode is first invoked. At step 410, the instruction pointed to by the code_ptr member of the context structure (indicated in FIG. 4 in conventional C programming language notation as "context_ptr->code_ptr" to indicate pointer dereferencing) is fetched and, at step 415, the code_ptr member of the context structure is incremented to point to the next instruction. At decision step 420, the fetched instruction is examined to determine if it indicates a remote procedure call (RPC). If so, execution proceeds to step 425 where procedure HandleRPC in the Host Call-Back interface is invoked with passed parameters module_name (here indicating the name of the code module to be executed remotely) and context_ptr->debug_flag. As described above, context_ptr->debug_flag is a Boolean quantity indicating whether the execution engine is presently operating in controlled-execution mode. At decision step 450, the code_ptr member of the context structure is examined to determine if it indicates the end of the code being executed by the embedded execution engine. If so, procedure ExecuteCode is exited. If not, execution returns to step 410 to fetch the next instruction indicated by code_ptr.

Returning to decision step 420, if the instruction does not indicate a remote procedure call, execution proceeds to decision block 430. At decision lock 430, context_ptr->debug_flag is inspected to determine whether the execution engine is operating in controlled-execution mode. If not, the instruction is interpreted and executed in step 445, followed by execution of decision step 450 as described above. If the execution engine is operating in controlled-execution mode, decision block 435 is executed to determine whether the fetched instruction indicates a break event. If not, steps 445 and 450 are executed as described above. If the fetched instruction does indicate a break event, procedure HandleBreakEvent in the call-back interface is called at step 440. A value, "event_no", indicating the break event detected in step 435 is passed to HandleBreakEvent as an input parameter. After the break event has been handled by procedure HandleBreakEvent, steps 445 and 450 are executed as described above.

It will be appreciated that while procedure ExecuteCode has been described as evaluating an instruction for break indication before the instruction is executed, the instruction may also be evaluated after it has been executed. Further, while the steps of procedure ExecuteCode indicate instruction by instruction incrementing of the code pointer context_ptr>code_ptr, it will be appreciated that many instructions will include operands that must be fetched and accounted for in the incrementing of the code pointer, and that an occasional branch or call instruction will be encountered. Herein the expression "incrementing the code pointer" is intended to cover branching, calling, incrementing beyond operands and any other such code pointer modification to point the code pointer at the instruction which logically follows execution of a previous instruction.

Figure 5:
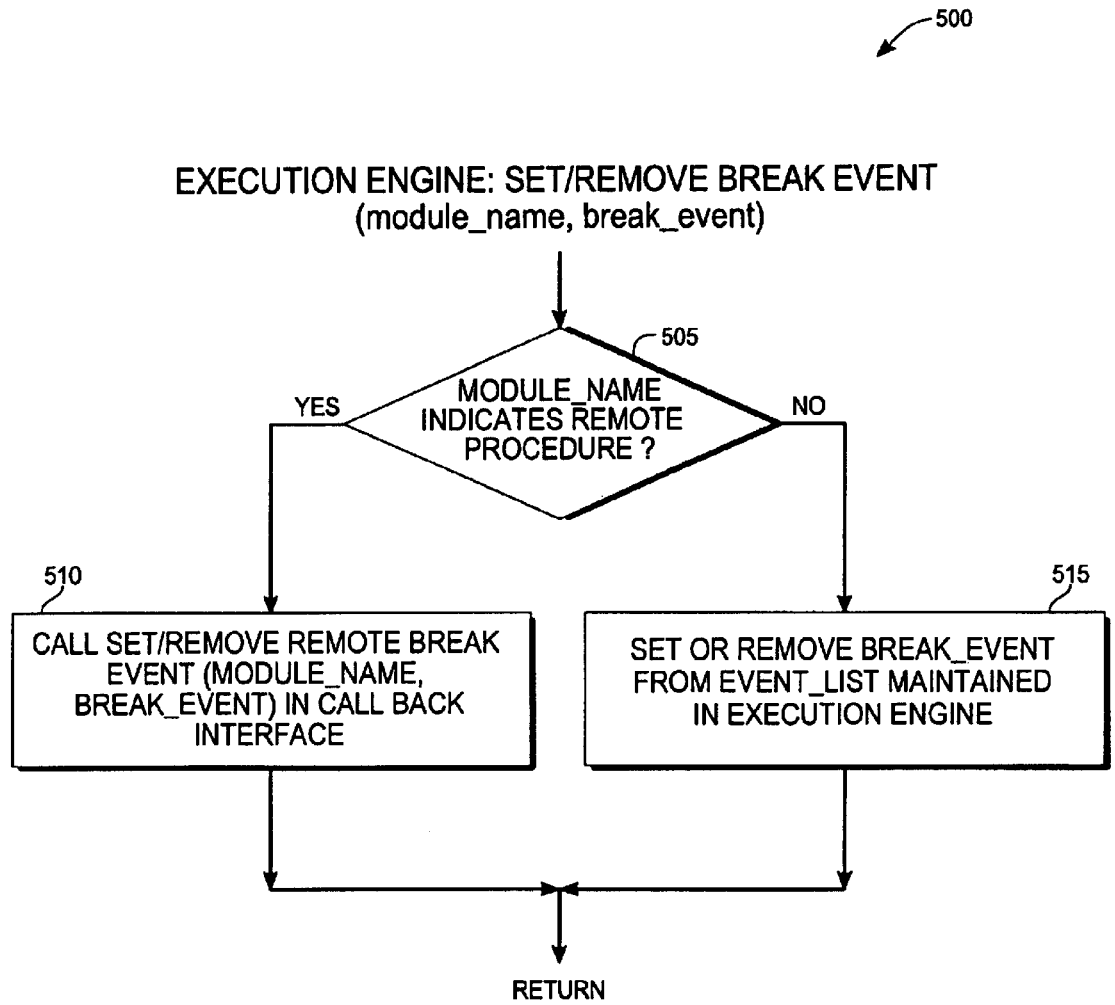
FIG. 5 is a flow diagram of execution engine procedure Set/RemoveBreakEvent.

FIG. 5 is a flow diagram 500 of procedure Set/RemoveBreakEvent, which receives input parameters module_name and break_event. Parameter module_name has the same significance as discussed above. Parameter break_event is data or pointer to data indicating one or more events to be installed or removed from the break event list maintained by the execution engine. For simplicity, parameter break_event is assumed to be a scalar value sufficient to enable the execution engine to determine a particular instruction, code pointer value or other characteristic that can be used to detect a break event. It will be appreciated that break_event could be a more complex data object providing information about a number of break events to be set or removed. In one embodiment of the present invention, it is also possible for parameter break_event to indicate a null break event, thereby signifying that no change in the break event list is necessary. The utility of such a null break event indicator will become clear in the discussion which follows.

At step 505 of flow diagram 500, the module_name parameter is checked against the name of any remote procedure call that might have issued. If the module_name does not indicate a code module being executed in response to a remote procedure call, execution proceeds to step 515 where break event or break events indicated by parameter break_event are set or removed from the event list maintained in the execution engine. After step 515 is executed, procedure Set/RemoveBreakEvent is exited, returning to its caller. It will be appreciated that whether break events are to be set or removed may be determined in a number of ways. First, a set/remove flag could accompany each break event indicated by parameter break_event. For example, parameter break_event could represent a data structure or a pointer to a data structure having a set/remove flag for each break event identifier. The set/remove flag could be used to determine whether the corresponding break event was to be added or deleted from the break event list. Alternatively, another parameter could be passed to the Set/RemoveBreakEvent to indicate whether a set or remove operation is required. In yet another embodiment, Set/RemoveBreakEvent could be split into two procedures SetBreakEvent and RemoveBreakEvent which, as their names imply, could be called alternatively to set and remove break events from the break event list maintained by the execution engine.

If, at step 505, the module_name parameter does indicate a remote procedure that is currently being executed, execution proceeds to step 510 where a call is made to procedure Set/RemoveRemoteBreakEvent in the call-back interface, passing parameters module_name and break_event. After procedure Set/RemoveRemoteBreakEvent has been executed, procedure Set/RemoveBreakEvent is also exited, returning to its caller.

Call-Back Interface Procedures

In one embodiment of the present invention, the call-back interface includes four procedures that can be called by the Host Call unit of the embedded execution engine: Load, HandleRPC, HandleBreakEvent and Set/RemoveRemoteBreakEvent. The embedded execution engine includes hooks to call-back interface procedures that are resolved by static or dynamic linking or by run-time initialization of the execution engine. In computer programming parlance, a "hook" is a call to a procedure external to a compiled object. Often, the hook is implemented as a call to a procedure indicated to by a pointer variable, and the address of a procedure for carrying out the hook function is assigned to the hook pointer during run-time. Alternatively, the hook can be merely a call to a named procedure, the address of which is supplied by a linker.

As stated above, the execution engine of the present invention may be embodied in a compiled object and include hooks to procedures in the call-back Interface that are resolved during run-time initialization of the execution engine, or by static or dynamic linking. This way, developers of the host program can achieve different program functionality by tailoring the call-back interface procedures. call-back interface routines which support controlled execution of partitioned code according to one embodiment of the present invention are described below.

Figure 6:
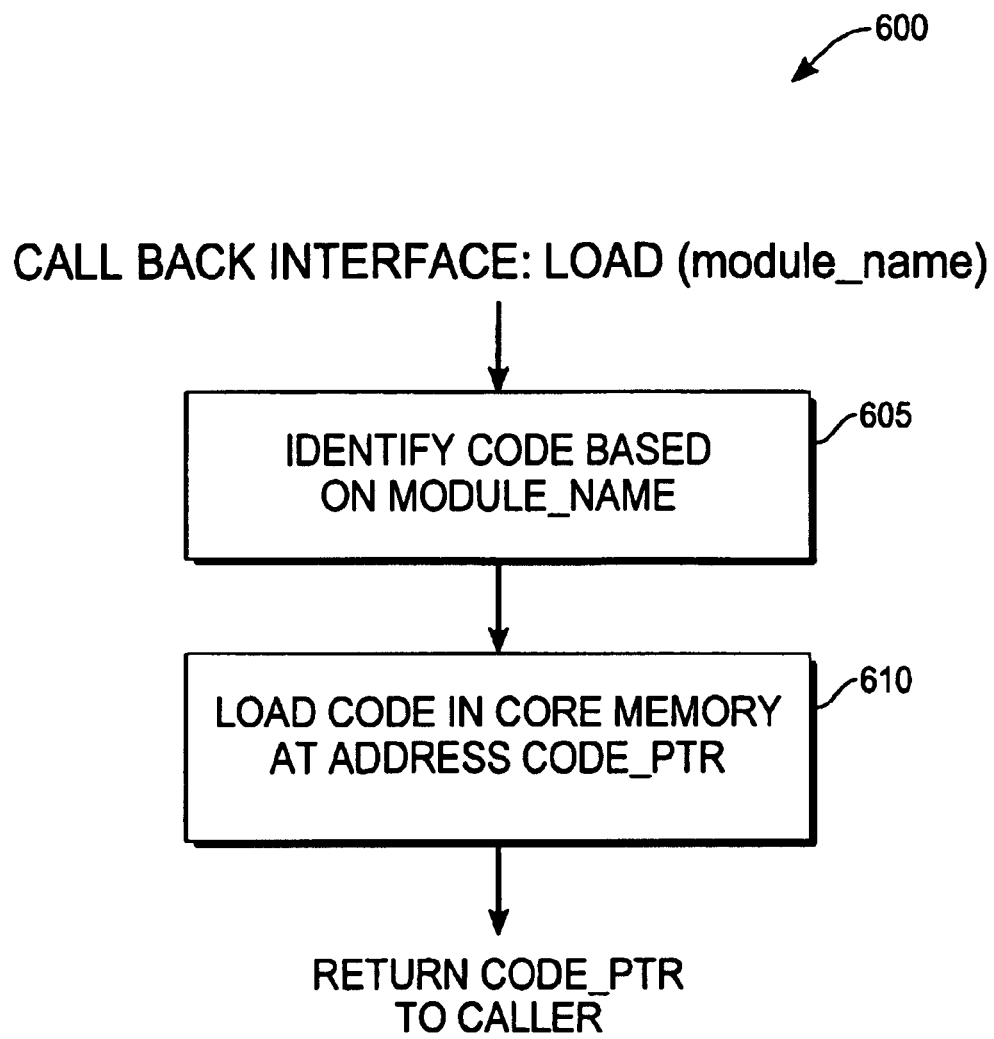
FIG. 6 is a flow diagram of call-back interface procedure Load.

FIG. 6 is a flow diagram 600 of call-back interface procedure Load. Procedure Load was introduced above in the discussion of execution engine procedure LoadCode. At step 605, procedure Load identifies code to be loaded into core memory based on input parameter module_name. At step 610, the identified code is retrieved (e.g., from a local hard drive, from a network server via a network access device, or from a site on the Internet, like a World Wide Web page) and loaded into core memory. Procedure Load then exits returning the starting core memory address of the code, referred to in diagram 600 as code_ptr, to the caller.

Figure 7:
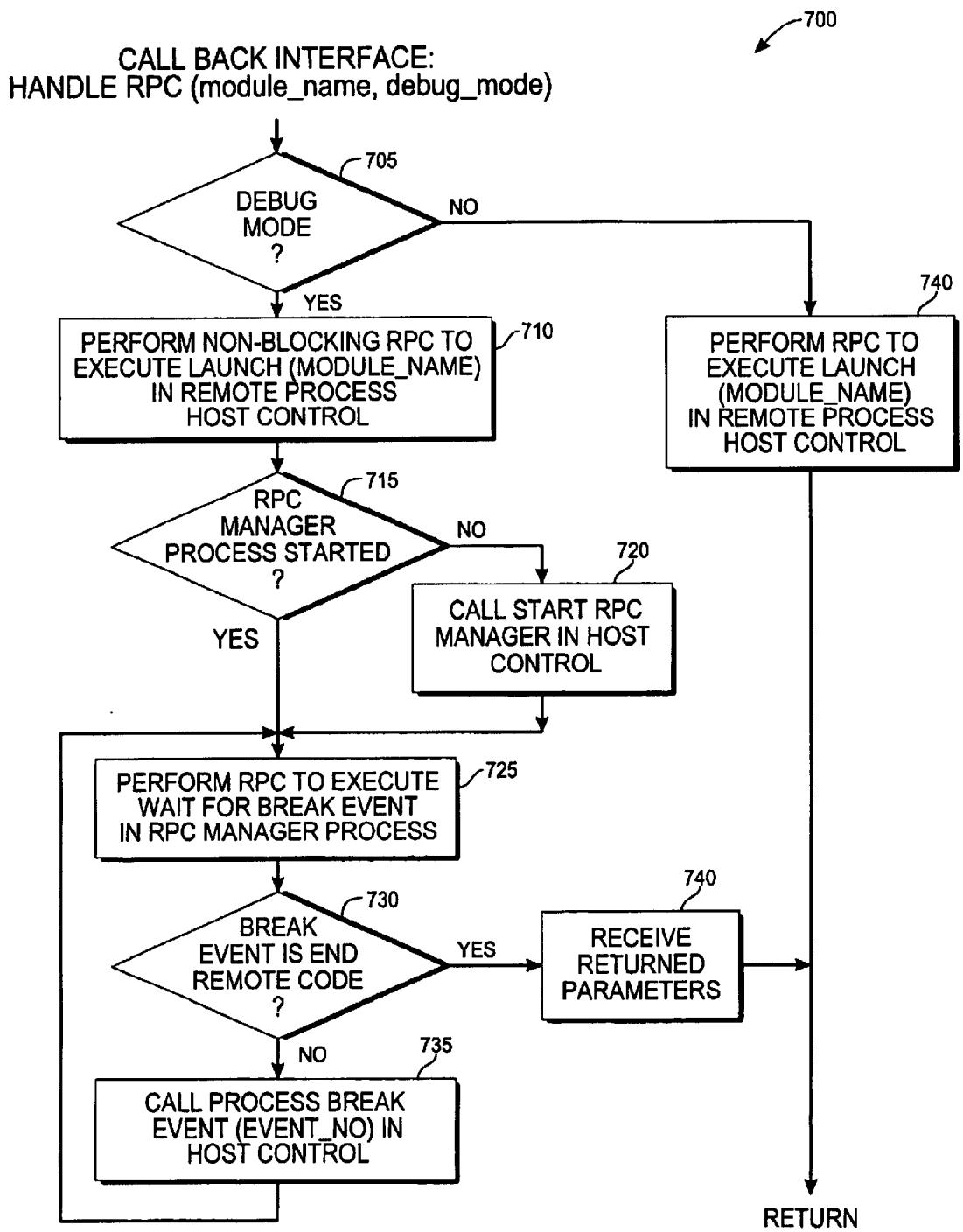
FIG. 7 is a flow diagram of call-back interface procedure HandleRPC.

FIG. 7 is a flow diagram 700 of call-back interface procedure HandleRPC. Recall that this procedure is invoked by the execution engine upon encountering an instruction indicating a remote procedure call. Procedure HandleRPC receives the name of the remote procedure, module_name, and a Boolean variable, debug_mode, indicating whether the execution engine is operating in controlled-execution mode. It will be appreciated that "debug_mode" is a formal parameter name, and that the actual parameter would be context_ptr->debug_flag, as discussed above in the description of procedure ExecuteCode. Parameter module_name, indicates the name of the code to be executed remotely. It will be appreciated that the remote procedure indicated by module_name may require input parameters. These input parameters may be passed to procedure HandleRPC by procedure ExecuteCode and may then be passed to the remote code module in a conventional manner. It will be further appreciated that other information will be necessary to effectuate the remote procedure call (e.g., process ID of the called process), but this information is unnecessary to understand the present invention.

At step 705, the parameter debug_mode is examined to determine if the execution engine is operating in controlled-execution mode. If not, at step 740 a remote procedure call is made to execute host control procedure Launch in a remote process. The name of the module to be executed in the remote process, viz., module_name, is a passed parameter. Executing the remote procedure call in step 740 causes the local process to suspend (i.e., block) pending return from the remote process.

If, at step 705, the debug_mode parameter indicates that the execution engine is operating in controlled-execution mode, execution proceeds to step 710 where a non-blocking remote procedure call is made to execute host control procedure Launch in the remote process. As with step 740, parameter module_name is passed to the remote process to indicate the code to be executed. A non-blocking remote procedure call, as its name implies, does cause the calling process to block. Consequently, without blocking pending return from the remote procedure call issued in step 710, decision block 715 is executed to determine whether a Remote Procedure Call Manager Process ("RPC Manager") has been created on the machine executing the remote process called in step 710. If no RPC manager process has yet been created, host control procedure StartRPCManager is called in step 720 to create the RPC Manager process.

Still tracking the controlled-execution path of diagram 700, at step 720, a remote procedure call is made to procedure WaitForBreakEvent in the RPC Manager process. As discussed below, procedure WaitForBreakEvent returns a value indicating the break event (like event_no, discussed above). Decision step 730 is executed to determine whether the break event indicates that the execution of the remote code module has been completed. If so, any parameters returned by the remote procedure call (including status information indicating that an exception has occurred) are handled at step 740 and then procedure HandleRPC is exited. If execution of the remote code module has not been completed, procedure ProcessBreakEvent in the local host control is called at step 735 with event_no passed as an input parameter. Finally, after ProcessBreakEvent returns, execution loops back to step 725 to make another remote procedure call to RPC Manager procedure WaitForBreakEvent. In this way, break events signaled by the remote process are detected and returned to the local process where they can be displayed for a user or logged in a tracing tool histogram or a performance profiling record. This way, from a single user-interface, a user can trace, debug or performance profile code executed in multiple processes and on separate machines.

Figure 8:
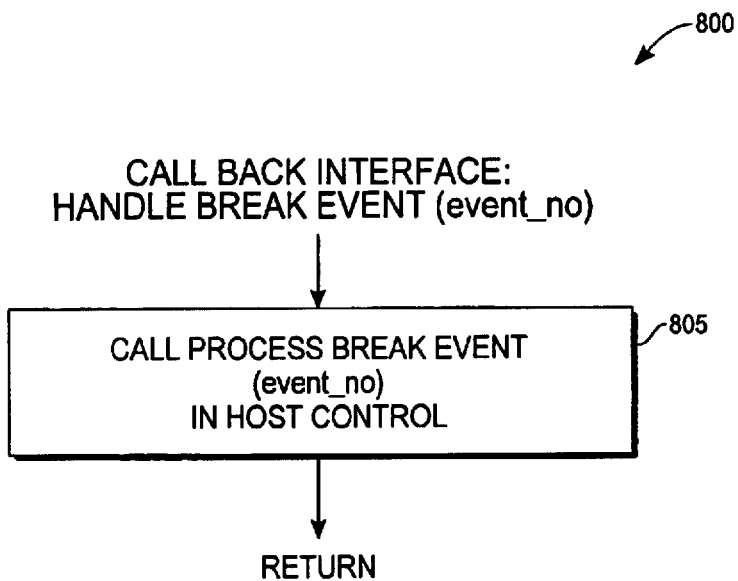
FIG. 8 is a flow diagram of call-back interface procedure HandleBreakEvent.

FIG. 8 is a flow diagram 800 of call-back interface procedure HandleBreakEvent. As discussed above, procedure -HandleBreakEvent is called by the execution engine upon detecting a break event and upon initial invocation of the execution engine. Procedure HandleBreakEvent receives the event identifier, event_no, as an input parameter and, at step 805, calls host control procedure ProcessBreakEvent with event_no as a passed parameter. After procedure ProcessBreakEvent returns, HandleBreakEvent exits and returns to its caller.

Figure 9:
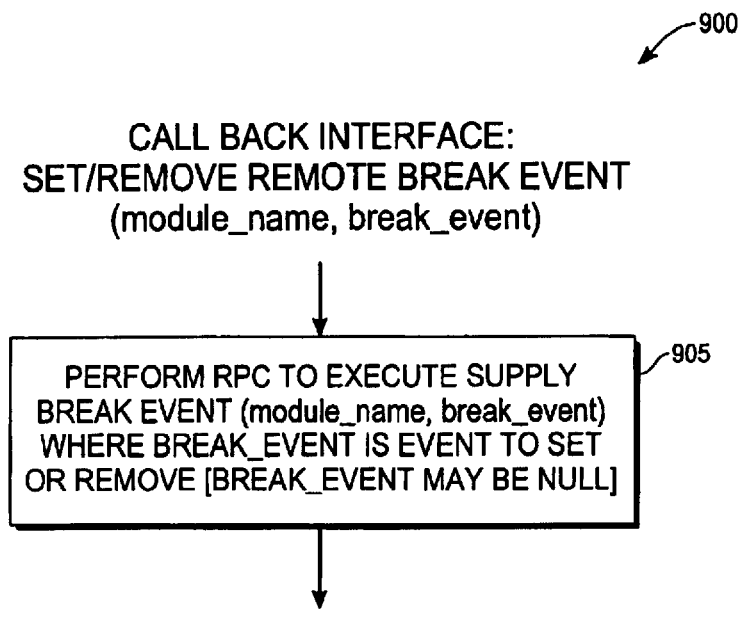
FIG. 9 is a flow diagram of call-back interface procedure Set/RemoveRemoteBreakEvent.

FIG. 9 is a flow diagram 900 of call-back Interface procedure Set/RemoveRemoteBreakEvent. As discussed above, execution engine procedure Set/RemoveBreakEvent invokes Set/RemoveRemoteBreakEvent upon receiving a request to set or remove a break event pertaining to a code module being executed in response to a remote procedure call. Parameters module_name and break_event are passed into procedure Set/RemoveRemoteBreakEvent, and, at step 905, a remote procedure call is made to RPC Manager procedure SupplyBreakEvent, passing parameters module_name and break_event. As stated above, break_event may be a null event, indicating that no change to the remote break event list is to be made.

Execution Interface Procedures

In one embodiment of the present invention, the execution interface contains three procedures that can be called by the host control to operate and monitor the execution engine: StartEngine, UpdateBreakEvent and ExamineContext. References to execution engine procedures in the execution interface code can be resolved by static or dynamic linking.

Figure 10:
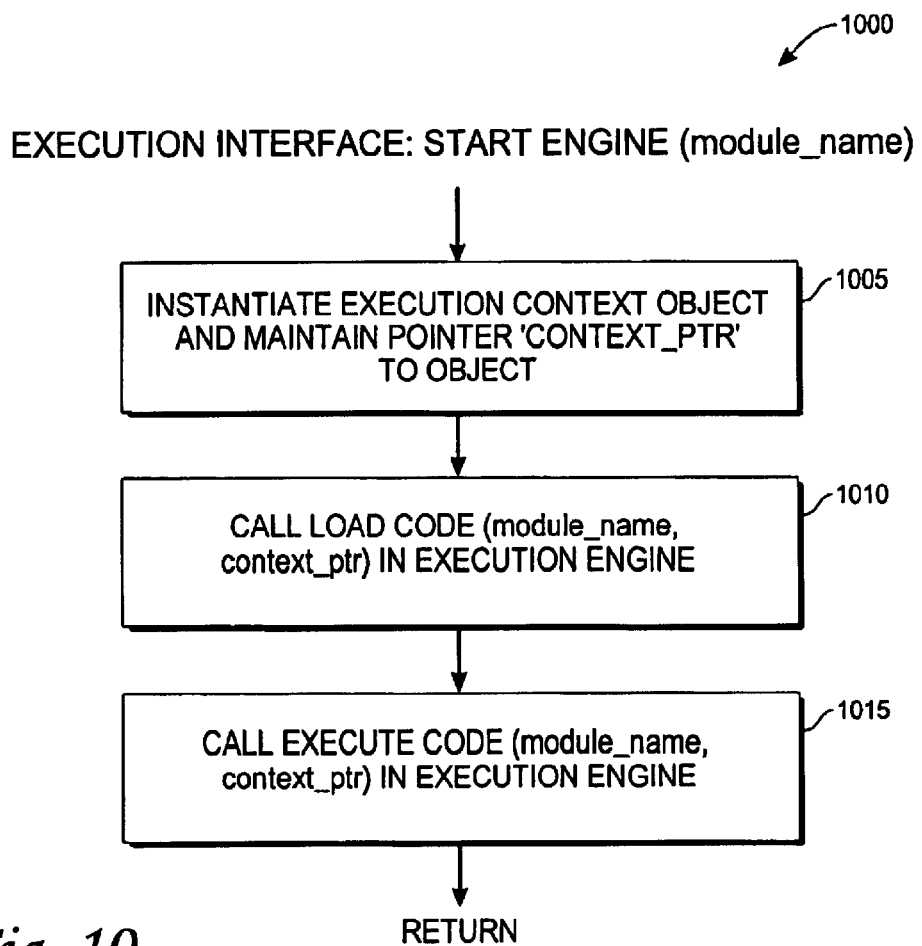
FIG. 10 is a flow diagram of execution interface procedure StartEngine.

FIG. 10 is a flow diagram 1000 of execution interface procedure StartEngine. Procedure StartEngine is invoked by execution of host control program code and receives module_name as an input parameter. At step 1005, an execution context data structure is instantiated. This data structure, identified by pointer context_ptr, is described above in reference to FIG. 20. At step 1010, execution engine procedure LoadCode is called with module_name and context_ptr passed as input parameters. The operation of LoadCode is also described above. At step 1015, execution engine procedure ExecuteCode is called with module_name and context_ptr again passed as input parameters. The operation of ExecuteCode is also discussed above. After procedure ExecuteCode returns, Start Engine is exited and returns to its caller.

Figure 11:
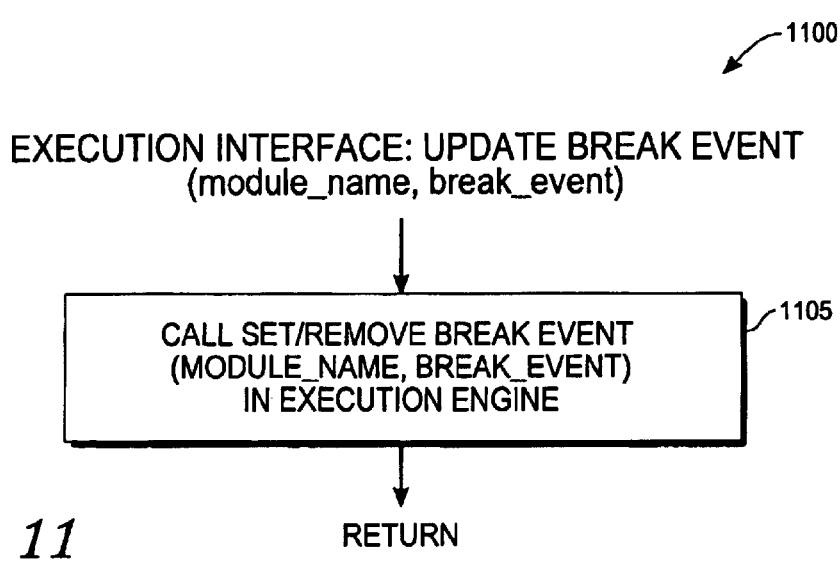
FIG. 11 is a flow diagram of execution interface procedure UpdateBreakEvent.

FIG. 11 is a flow diagram 1100 of execution interface procedure UpdateBreakEvent. At step 1105 procedure UpdateBreakEvent calls execution engine procedure Set/RemoveBreakEvent passing on its input parameters module_name and break_event. Parameters module_name and break_event are as discussed above. After procedure Set/RemoveBreakEvent is exited, procedure UpdateBreakEvent is also exited, returning to its caller.

Figure 12:
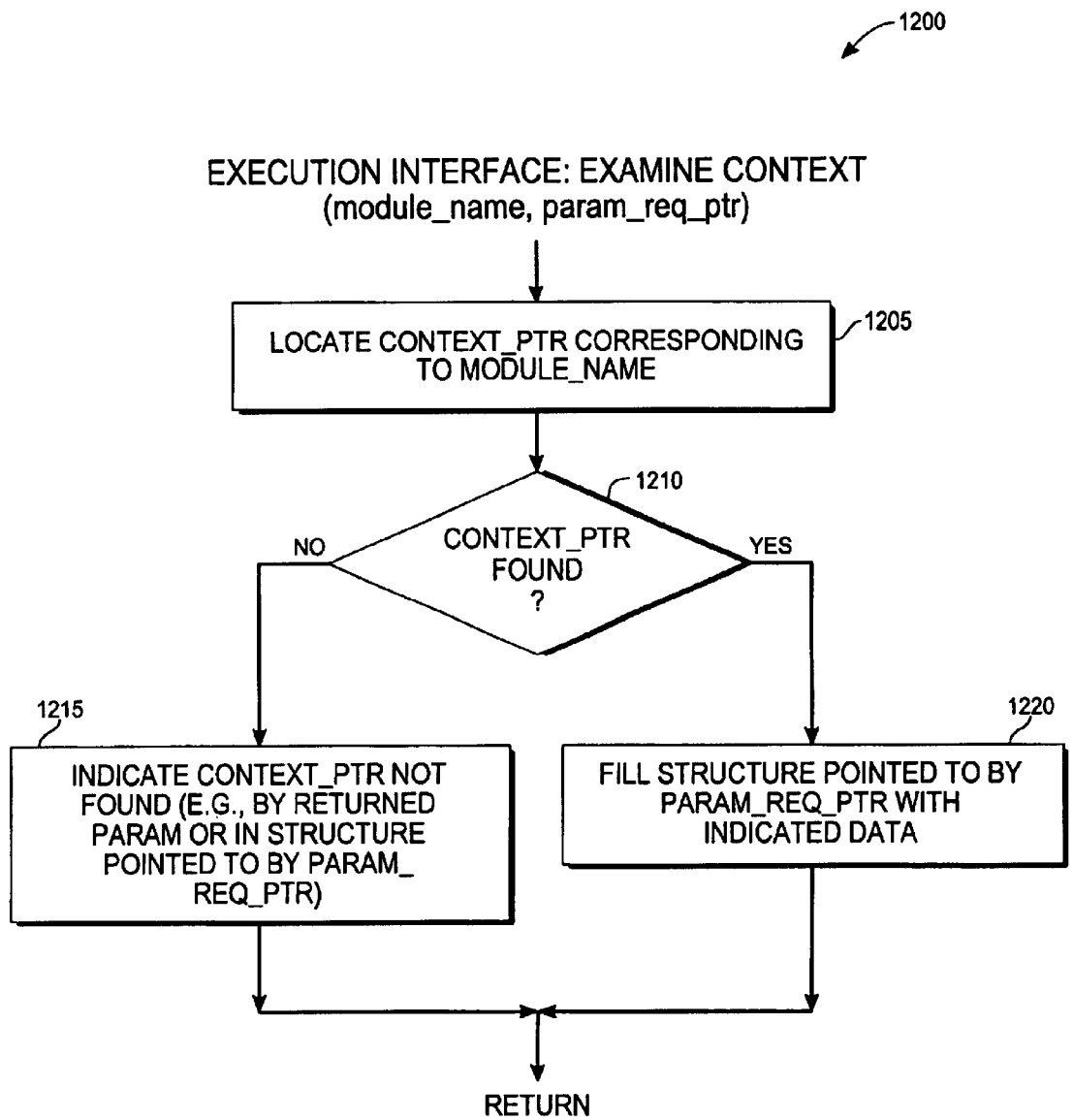
FIG. 12 is a flow diagram of execution interface procedure ExamineContext.

FIG. 12 is a flow diagram 1200 of execution interface procedure ExamineContext. Procedure ExamineContext is called by execution of host control code to obtain information pertaining to the execution of a code module in the Execution Engine. Procedure ExamineContext receives parameter module_name, indicating the name of the code module being executed by the execution engine, and parameter param_req_ptr. In one embodiment of the present invention, param_req_ptr is a pointer to a data structure including members indicating the data sought by the host control, and members to which retrieved execution information can be written.

At step 1205, a pointer to a context structure instantiated by a previous call to execution interface procedure StartEngine is identified based on input parameter module_name. At decision block 1210, the pointer to the context structure, i.e., context_ptr, is evaluated to determine whether a valid pointer was found. A conventional way to accomplish this is to initialize the context_ptr variable to a null value before executing step 1205. Then at step 1210, if the context_ptr is non-null, a valid pointer to a context structure is deemed found. If a valid context structure pointer is found, execution proceeds to step 1220 where the context_ptr is dereferenced to locate the information indicated by parameter param_req_ptr and to store the requested data in the param_req_ptr structure. After step 1220, procedure ExamineContext is exited, returning to its caller.

It will be appreciated that there are a number of alternative techniques that could be used to retrieve execution information from the context structure maintained by the execution interface. For example, instead of a single call passing a pointer to a data structure to be filled with execution information, multiple calls could be made in succession, each call obtaining only one value sought. So long as execution information is made available to the caller of ExamineContext, any technique for retrieving execution information from the context data structure is within the spirit and scope of the present invention.

Returning to decision step 1210, if a valid context structure pointer is not found, this fact is indicated to the caller. This can be done by setting a flag in the data structure pointed to by param_req_ptr or by returning a Boolean variable indicating the success of the ExamineContext call. In the embodiment depicted in FIG. 12, the former technique is effectuated by step 1215. After step 1215 is executed, procedure ExamineContext is exited.

Host Control Procedures

As stated above, the host control program code determines the overall functionality of the host program. For example, the host control could include code which, when executed by a processor, interacts with a user to allow the user to set or remove break events and to view execution information. Alternatively, by coding the host control to log break events without human intervention (e.g., logging each procedure entry then continuing, or logging each procedure entry and exit) code tracing and performance profiling applications can be achieved. Also, as discussed above, by embedding an execution engine according to the present invention into a host program, it becomes possible control the execution of code partitioned across multiple processes.

Figure 13:
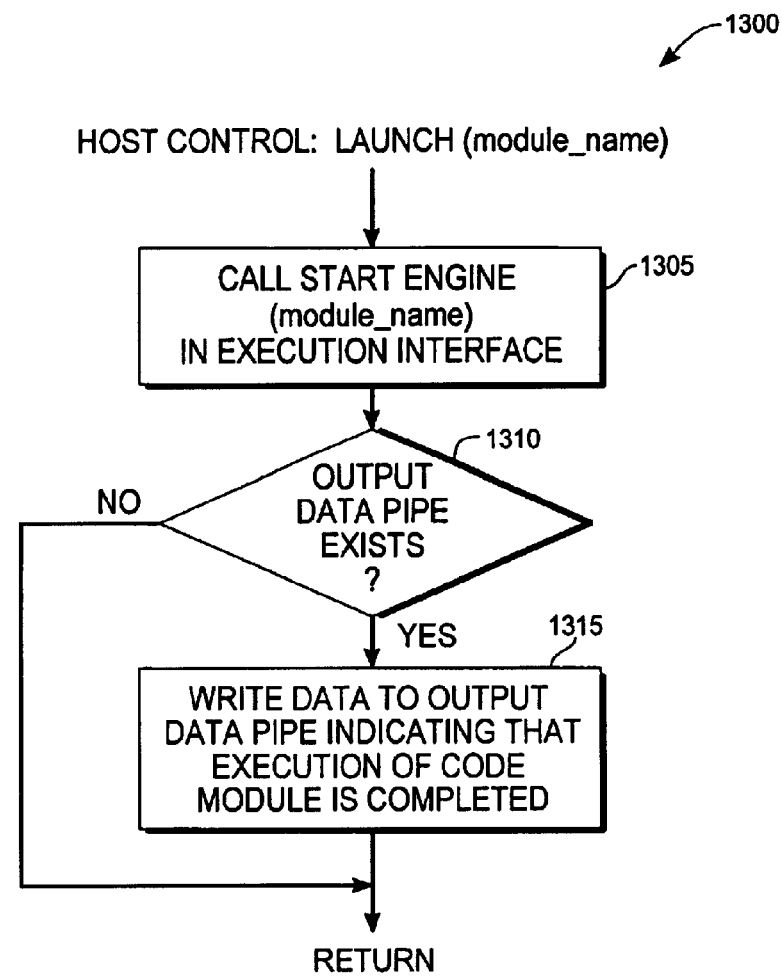
FIG. 13 is a flow diagram of host control procedure Launch.

FIG. 13 is a flow diagram 1300 of host control procedure Launch. Launch receives module_name as an input parameter and, at step 1305, calls procedure StartEngine in the execution interface, passing parameter module_name. In one embodiment of the present invention, procedure Launch can be invoked in one of two ways: in response to a command from a user received via user-interface code included in the host program, or through receipt of a remote procedure call issued from another process.

At decision step 1310, procedure Launch is executed to determine whether an output data pipe exists. As discussed above, pipes are memory regions used by two or more processes to communicate. If a data pipe has been provided to the process executing procedure Launch, the presence of the data pipe can be detected, for example, by querying a static or global process data structure including a member indicating the presence and location of an input data pipe. Other methods of detecting presence of the pipe, including receiving notification via input parameter, are within the scope and spirit of the present invention.

If, at decision step 1310, an output data pipe is detected, data is written to the output data pipe in step 1315 to indicate that execution of the code module identified by module_name has been completed. This information is used by the HandleRPC procedure described above (see diagram 700, step 730). If no output data pipe is detected at step 1310, or after execution of step 1315, procedure Launch is exited, returning to its caller.

It will be appreciated that while procedure Launch has been shown in FIG. 13 as receiving only the name of the code module to be executed, procedure Launch could also receive other input parameters referenced during execution of the code module. Also, procedure Launch may return parameters to its local or remote caller.

Figure 14:
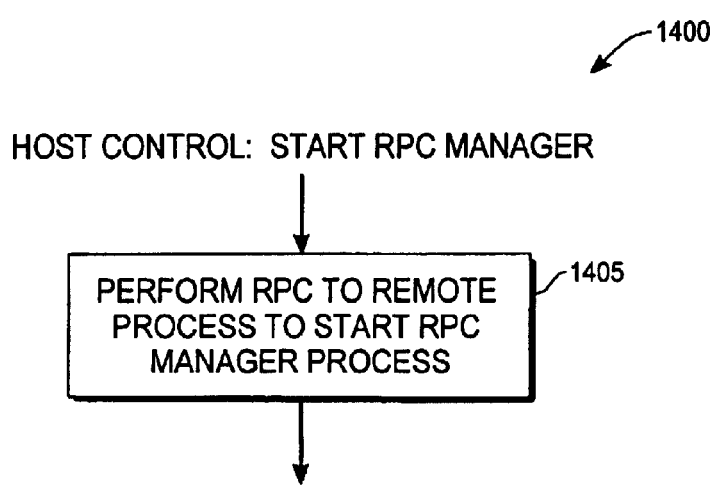
FIG. 14 is a flow diagram of host control procedure StartRPCManager.

FIG. 14 is a flow diagram 1400 of host control procedure StartRPCManager. At step 1405, StartRPCManager makes an RPC to a remote process, requesting the process to spawn an RPC Manager process. As discussed above, the RPC Manager process is executed to establish an input and output pipe to a remote host application program and includes a collection of routines that can be called to supply input to, and read output from, a remote host application program.

Figure 15:
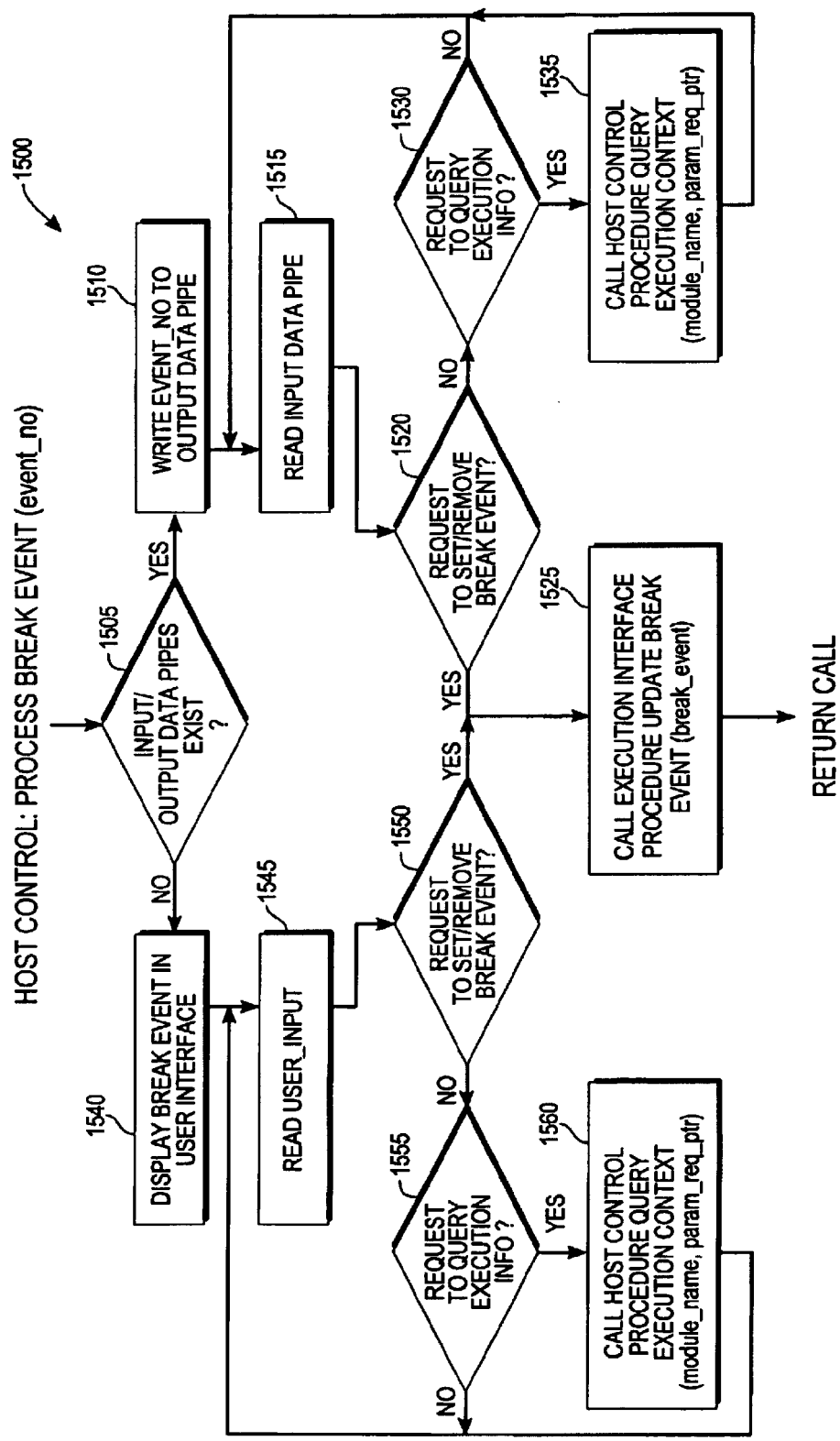
FIG. 15 is a flow diagram of host control procedure ProcessBreakEvent.

FIG. 15 is a flow diagram 1600 of host control procedure ProcessBreakEvent that is called by call-back Interface procedure HandleBreakEvent (described above). ProcessBreakEvent receives parameter event_no as an input parameter. At step 1505, ProcessBreakEvent determines whether input and output data pipes exist. If input and output data pipes are detected, parameter event_no is written to the output data pipe at step 1510, then the input data pipe is read at step 1515 to determine if a request to set/remove break events or to query execution information has been received. If at step 1520, a request to set or remove a break event is detected, execution interface-procedure UpdateBreakEvent is called in step 1525 with the indicated break event being supplied as a passed parameter. After procedure UpdateBreakEvent returns, procedure ProcessBreakEvent returns to its caller in the call-back interface.

If, at decision step 1520, no set/remove break event request is detected, decision step 1530 is executed to determine if a query request has been made. If not, execution loops back to step 1515 to read the input data pipe again. If a query request is detected at step 1530, host control procedure QueryExecutionContext is called, receiving input parameters module_name and param_req_ptr. These parameters have the significance discussed above in reference to procedure ExamineContext. When QueryExecutionContext returns, execution loops back to step 1515 to read the input data pipe again. Thus, the host application program repeatedly responds to requests for execution information received at the input data pipe, and does not unwind to the execution engine until a new break event is supplied. Execution of code in the execution engine can be resumed without updating the existing break event list if a null break event is supplied. Alternatively, a restart command could be added to the repertoire of commands handled by procedure ProcessBreakEvent.

If at step 1505, input and output data pipes are not detected, the break event indicated by event_no is displayed in a user-interface at step 1540. At this point the user is prompted to set or remove a break event or to query the execution context. As an aside, in most cases much of the user-interface code executed to display break event information and to retrieve keyboard and mouse input is implemented in device drivers and exists separately from the host application code.

At step 1545, user input is retrieved via execution of user-interface code. Decision steps 1550 and 1555 are analogous to decision steps 1520 and 1530 discussed above, except that the detected requests are received via execution of user-interface code instead of by reading an input data pipe. If, at step 1550, a request to set/remove a break event is detected, execution interface procedure UpdateBreakEvent is called in step 1525 (discussed above) and procedure ProcessBreakEvent is exited. Otherwise, if a request to query execution information is detected at step 1555, host control procedure QueryExecutionContext is called in step 1560. After procedure QueryExecutionContext returns, execution of procedure ProcessBreakEvent loops back to step 1545. Also, if neither a query request or a set/remove break event request is detected in steps 1550 and 1555, execution loops back to step 1545.

It will be appreciated that the polling construct implemented by steps 1515, 1520 and 1530 (and by steps 1545, 1550 and 1555) may result in infinite looping. Though not shown in steps 1515 and 1520, or in other polling constructs described herein, a timeout capability can be added to abort the polling operation beyond a threshold number of successive read operations or beyond a threshold time.

Figure 16:
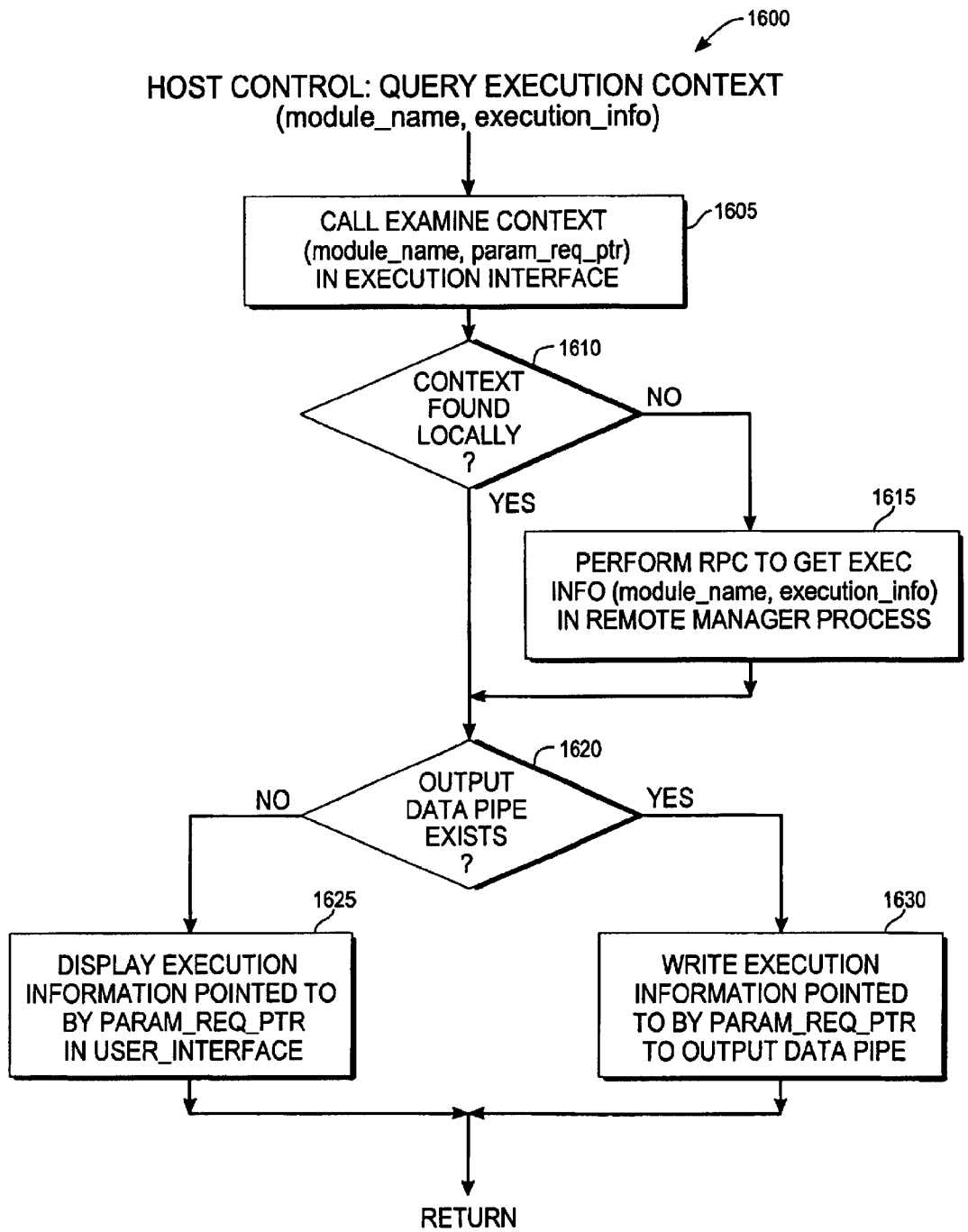
FIG. 16 is a flow diagram of host control procedure QueryExecutionContext.

FIG. 16 is a flow diagram 1600 of host control procedure QueryExecutionContext. Procedure QueryExecutionContext receives module_name and execution_info as input parameters, and is used to retrieve execution information resulting from the execution of code by the execution engine. Parameter module_name, as discussed above, indicates the name of the code module being executed by the embedded execution engine. Parameter execution_info is used to indicate the execution information sought (e.g., stack based data, static or global variables, code, etc.). At step 1605, execution interface procedure ExamineContext is called, receiving module_name and param_req_ptr as input parameters. In one embodiment of the present invention, execution_info is a data structure that can be used to fill the data structure pointed to by param_req_ptr to indicate the information sought by the context query.

As described above, execution interface procedure ExamineContext will return an indicator of whether a context structure corresponding to module_name was located. Consequently, at decision step 1610, if the context structure was found by the call to ExamineContext, decision block 1620 is executed to determine whether an output data pipe exists. If so, the execution information pointed to by param_req_ptr is written to the output data pipe at step 1630. If an output data pipe does not exist, the execution information pointed to by param_req_ptr is displayed in a user-interface via execution of user-interface code in step 1625. If, at step 1620, an output data pipe is detected, the execution information pointed to by param_req_ptr is written to the output data pipe in step 1630. After execution of either step 1625 or step 1630, procedure QueryExecutionContext is exited, returning to its caller.

Returning to decision step 1610, if the execution context structure corresponding to module_name is not found in the call to ExamineContext, a remote procedure call is made to RPC Manager procedure GetExecInfo in step 1615. The module_name and execution_info parameters are passed into GetExecInfo via the remote procedure call. Information returned by GetExecInfo is written into a data structure pointed to by param_req_ptr so that execution of steps 1620, 1625 and 1630 is as described above.

Procedures Provided in the RPC Manager Process

As stated above, the RPC Manager process is used to supply input to a remote host application program and to retrieve remote host application program output. In one embodiment of the present invention, this is accomplished in three RPC Manager procedures: WaitForBreakEvent, SupplyBreakEvent and GetExecInfo. Each of these procedures is discussed in further detail below.

Figure 17:
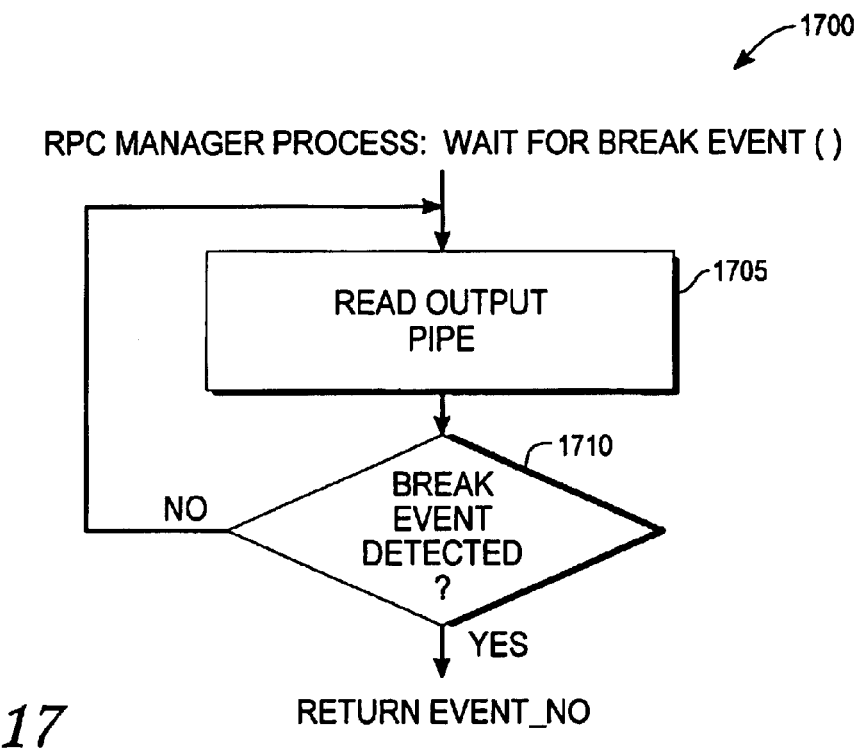
FIG. 17 is a flow diagram of RPC Manager procedure WaitForBreakEvent.

FIG. 17 is a flow diagram 1700 of RPC Manager procedure WaitForBreakEvent. At step 1705, the output data pipe established between the RPC Manager process and the remote host process is read to determine if a break event has been detected by the remote host process. At step 1710, if no break event has been detected, execution loops back to step 1705 to read the output data pipe again. If, at step 1710, a break event has been detected, a parameter indicating the event (event_no) is returned to the caller. As discussed above, the polling construct implemented by steps 1705 and 1710 may include a mechanism for avoiding infinite looping.

Figure 18:
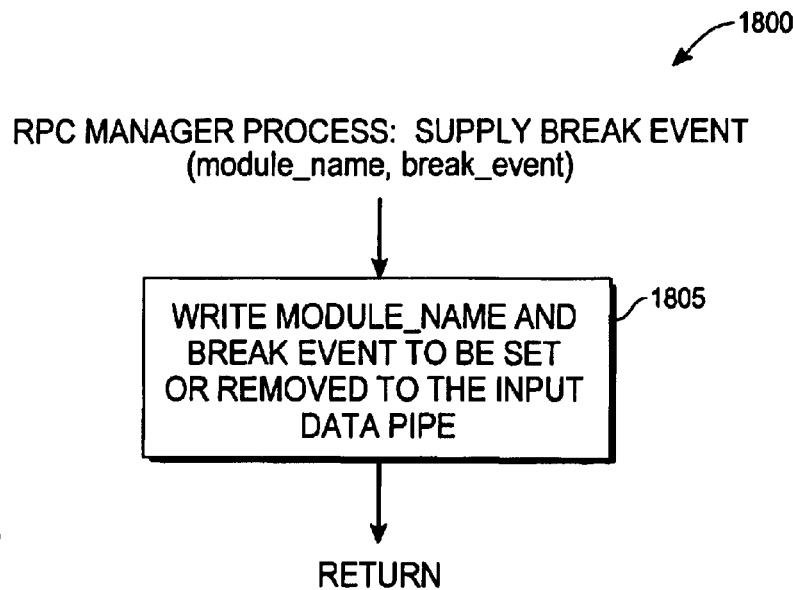
FIG. 18 is a flow diagram of RPC Manager procedure SupplyBreakEvent.

FIG. 18 is a flow diagram 1800 of RPC Manager procedure SupplyBreakEvent. Procedure SupplyBreakEvent receives module_name and break_event as input parameters, then writes the indicated module name and break event (to be set or removed) to the input data pipe in step 1805. After step 1905, SupplyBreakEvent returns to its caller.

Figure 19:
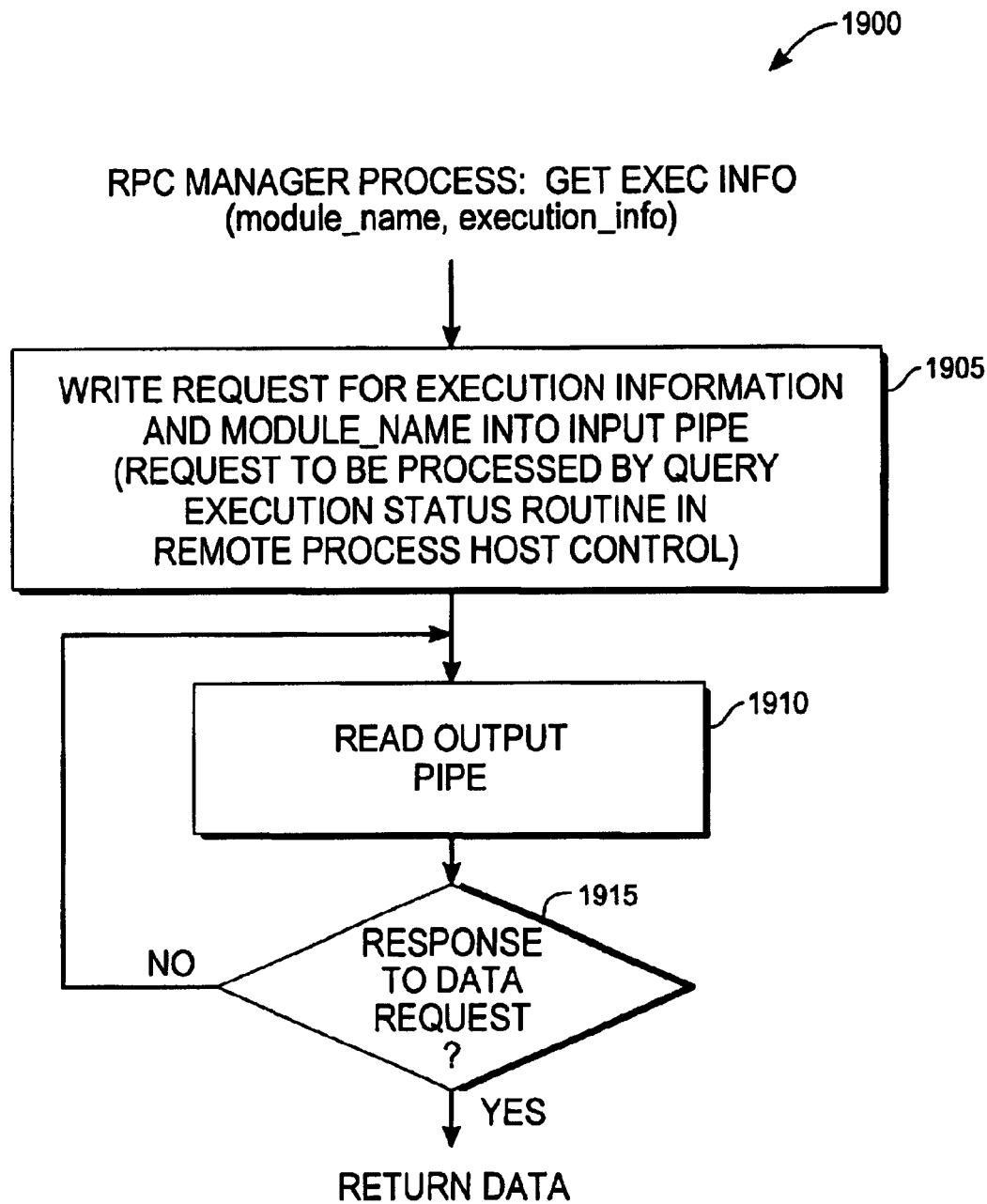
FIG. 19 is a flow diagram of RPC Manager procedure GetExecInfo.

FIG. 19 is a flow diagram 1900 of RPC Manager procedure GetExecInfo. GetExecInfo receives module_name and execution_info as input parameters, then, at step 1905, writes the indicated module name and requested execution information to the input data pipe established between the RPC Manager process and the remote host application process. At step 1910, the output data pipe is read to determine if the remote host application program has responded to the request for execution information. If, at decision step 1915, no response to the execution information request is detected, execution loops back to step 1910 to read the output data pipe again. If the requested data is detected at decision step 1915, GetExecInfo terminates, returning the execution information read from the output data pipe to its caller.

Computer System Overview

Figure 21:
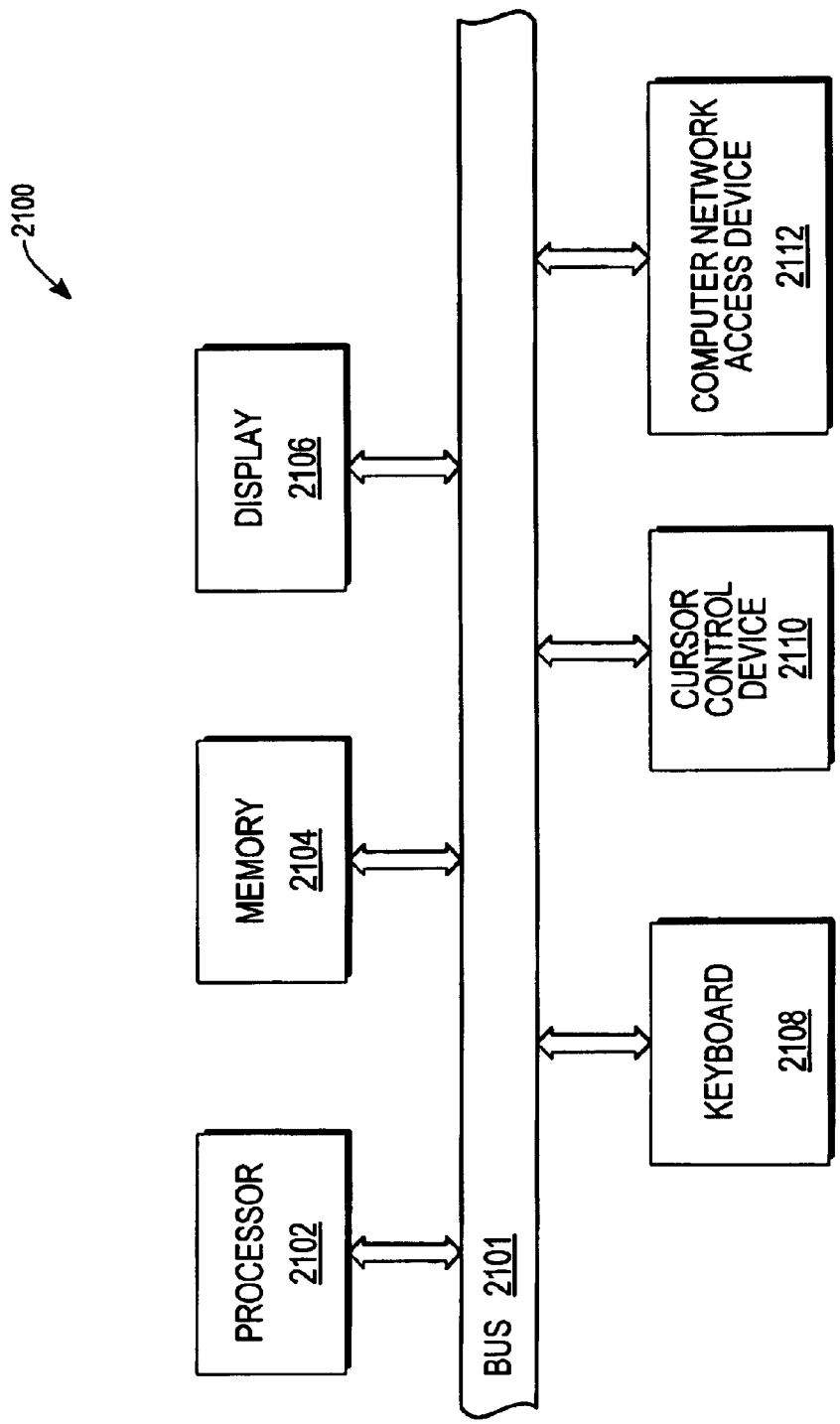
FIG. 21 illustrates a computer system which may be used to perform the steps of the method of the present invention.

FIG. 21 illustrates a general purpose computer system 2100 for performing the individual steps of the method of the present invention. The computer system includes a processor 2102, memory 2104, display 2106, keyboard 2108, cursor control device 2110 and computer-network access device 2112, each coupled to a bus 2101. Processor 2102 fetches instructions stored in memory 2104 via bus 2101 and executes the instructions to perform operations on data, which is also stored in memory 2104. Execution of certain sequences of instructions by processor 2102 results in processor 2102 writing to display 2106 to present an image thereon, and writing to and reading from computer network access device 2112 to communicate with one or more other computers on a computer network. Computer network access device may be a modem, local or wide area network card or any other similar device for communicating with a computer network. Cursor control device 2110 may be a mouse, trackball or other device for manipulating a cursor on display 2106. Both the cursor control device 2110 and the keyboard 2108 enable the computer system 2100 to receive input from a computer-user.

Memory 2104 includes both operating memory (e.g., random access memory) and non-volatile storage such as a read-only-memory, hard disk-drive, floppy disk-drive or other computer-readable medium. When power is applied to the computer system 2100, an operating system (OS) is loaded from non-volatile storage into operating memory by processor 2102 or another device, such as a direct memory access controller (not shown), having access to memory 2104. Sequences of instructions comprised by the OS are then executed by processor 2102 to load other computer programs and portions of computer programs into operating memory from non-volatile storage. The present invention may be embodied in a sequence of instructions which can be stored in a computer-readable medium and executed by processor 2102. should be noted that the individual method steps of the present invention may be performed by a general purpose processor programmed with instructions that cause the processor to perform the recited steps (as described above), specific hardware components that contain hard-wired logic for performing the recited steps, or any combination of programmed general purpose computer components and custom hardware components may also be used. Nothing disclosed herein should be construed as limiting the present invention to a single embodiment wherein the recited steps are performed by a specific combination of hardware components.

A method and apparatus for controlling execution of partitioned code is thus described.

What is claimed is:

1. A first debugger that is configured to:
debug a first sequence of instructions of a first application; and
cause a second debugger to debug a second sequence of instructions of a second application in response to a call from the first sequence of instructions to the second sequence of instructions.

2. A method for controlling the execution of applications, the method comprising the computer-implemented steps of:
while a first controlled execution tool executes a first sequence of instructions of a first program, detecting a call from the first sequence of instructions to a second sequence of instructions of a second program; and
in response to the call, automatically causing the second sequence of instructions to be executed by a second controlled execution tool that is independent of the first controlled execution tool.

3. The method of claim 2, further comprising the computer-implemented step of:
while the second controlled execution tool executes the second sequence of instructions, exchanging data between the first controlled execution tool and the second controlled execution tool.

4. The method of claim 3, wherein the step of exchanging data with the second controlled execution tool includes the computer-implemented step of:
sending data to the second controlled execution tool, wherein the data is used by the second controlled execution tool when executing the second sequence of instructions.

5. The method of claim 4, wherein the data specifies a break event to be detected during execution by the second controlled execution tool of the second sequence of instructions.

6. The method of claim 3, wherein the step of exchanging data with the second controlled execution tool includes the computer-implemented step of:
receiving data from the second controlled execution tool, wherein the data describes execution of the second sequence of instructions by the second controlled execution tool.

7. The method of claim 6, wherein the data specifies a break event that was detected during execution by the second controlled execution tool of the second sequence of instructions.

8. The method of claim 2, wherein:
the first controlled execution tool is selected from the group consisting of a first debugger, a first tracing application, and a first profiler application; and
the second controlled execution tool is selected from the group consisting of a second debugger, a second tracing application, and a second profiler application.

9. The method of claim 2, wherein:
the first controlled execution tool executes the first sequence of instructions in a mode selected from the group consisting of controlled execution mode and free running mode;
controlled execution mode allows for use of one or more break points while the first controlled execution tool executes the first sequence of instructions; and
free running mode does not allow the use of one or more break points while the first controlled execution tool executes the first sequence of instructions.

10. The method of claim 2, wherein the first sequence of instructions is platform independent code.

11. The method of claim 2, wherein the first sequence of instructions is platform specific code that is designed for execution on a platform upon which the first controlled execution tool executes the first sequence of instructions.

12. The method of claim 2, wherein the first sequence of instructions is code that is selected from the group consisting of source code, object code, and executable code.

13. The method of claim 2, wherein:
the first controlled execution tool executes the first sequence of instructions in a first operating environment; and
the second controlled execution tool executes the second sequence of instructions in a second operating environment that is different than the first operating environment.

14. The method of claim 2, further comprising the computer-implemented step of:
receiving input from a user through a user interface, wherein the input is used by the first controlled execution tool when executing the first sequence of instructions and by the second-controlled execution tool when executing the second sequence of instructions.

15. The method of claim 2, further comprising the computer-implemented step of:
providing information to a user about the execution of the first sequence of instructions by the first controlled execution tool and about the execution of the second sequence of instructions by the second controlled execution tool.

16. The method of claim 2, wherein the call is a remote procedure call.

17. The method of claim 2, further comprising the computer-implemented steps of:
while the second controlled execution tool executes the second sequence of instructions, detecting an additional call from the second sequence of instructions to a third sequence of instructions of a third program; and
in response to the additional call, automatically causing the third sequence of instructions to be executed by a third controlled execution tool.

18. The method of claim 2, further comprising the computer-implemented steps of:
prior to the first application executing the first sequence of instructions, instantiating a data structure;
the first controlled execution tool using the data structure when the first controlled execution tool executes the first sequence of instructions; and
the second controlled execution tool using the data structure when the second controlled execution tool executes the second sequence of instructions.

19. The method of claim 2, wherein the first controlled execution tool includes an execution object that executes the first sequence of instructions.

20. The method of claim 19, further comprising the computer-implemented step of:
the execution object controlling execution of the first sequence of instructions.

21. The method of claim 20, wherein the step of the execution object controlling execution of the first sequence of instructions includes the step of:
the execution object functioning as a programming language subsystem.

22. The method of claim 19, wherein the execution object comprises a command unit, an execution unit, and a call unit, and the method further comprises the computer-implemented steps of:
the command unit receiving a command to execute the first sequence of instructions;
the execution unit interpreting the first sequence of instructions for execution by a processor until a condition is detected; and
the call unit that initiating a call when the condition is detected.

23. The method of claim 22, wherein the condition is encountering an instruction to perform a remote procedure call.

24. The method of claim 22, wherein the condition is encountering a position within the first sequence of instructions that is associated with a break event.

25. The method of claim 22, wherein in response to detecting the condition, the first controlled execution tool halts execution of the first sequence of instructions.

26. The method of claim 25, wherein in response to detecting an additional condition, the first controlled execution tool resumes execution of the first sequence of instructions.

27. The method of claim 22, wherein in response to detecting the condition, the first controlled execution continues execution of the first sequence of instructions to monitor execution of the second sequence of instructions by the second application.

28. The method of claim 2, wherein the second controlled execution tool includes an execution object that executes the second sequence of instructions.

29. The method of claim 28, further comprising the computer-implemented step of:
the execution object controlling execution of the second sequence of instructions.

30. The method of claim 29, wherein the step of the execution object controlling execution of the second sequence of instructions includes the step of:
the execution object functioning as a programming language subsystem.

31. The method of claim 28, wherein the execution object comprises a command unit, an execution unit, and a call unit, and the method further comprises the computer-implemented steps of:
the command unit receiving a command to execute the second sequence of instructions;
the execution unit interpreting the second sequence of instructions for execution by a processor until a condition is detected; and
the call unit that initiating a call when the condition is detected.

32. The method of claim 31, wherein the condition is encountering an instruction to perform a remote procedure call.

33. The method of claim 31, wherein the condition is encountering a position within the second sequence of instructions that is associated with a break event.

34. The method of claim 31, further comprising the computer-implemented steps of:
receiving information about the execution of the second sequence of instructions when the condition is detected.

35. A method for debugging an application, the method comprising the computer-implemented steps of:
while debugging a first sequence of instructions with a first debugging application, detecting a call from the first sequence of instructions of a first program to a second sequence of instructions of a second program; and in response to the call, automatically causing the second sequence of instructions to be debugged by a second debugging application.

36. The method of claim 35, wherein the call is a remote procedure call.

37. The method of claim 35, wherein debugging the first sequence of instructions includes using an execution object that functions as a programming language subsystem to control execution of the first sequence of instructions.

38. The method of claim 35, wherein debugging the second sequence of instructions includes using an execution object that functions as a programming language subsystem to control execution of the second sequence of instructions.

39. A computer-readable medium carrying one or more sequences of instructions for controlling the execution of applications, wherein execution of the one or more sequences of instructions by one or more processors causes the one or more processors to perform the steps of:
while a first controlled execution tool executes a first sequence of instructions of a first program, detecting a call from the first sequence of instructions to a second sequence of instructions of a second program; and
in response to the call, automatically causing the second sequence of instructions to be executed by a second controlled execution tool that is independent of the first controlled execution tool.

40. The computer-readable medium of claim 39, further comprising instructions which, when executed by the one or more processors, cause the one or more processors to carry out the steps of:
while the second controlled execution tool executes the second sequence of instructions, exchanging data between the first controlled execution tool and the second controlled execution tool.

41. The computer-readable medium of claim 40, wherein the instructions for exchanging data with the second controlled execution tool further comprise instructions which, when executed by one or more processors, cause the one or more processors to carry out the step of:
sending data to the second controlled execution tool, wherein the data is used by the second controlled execution tool when executing the second sequence of instructions.

42. The computer-readable medium of claim 41, wherein the data specifies a break event to be detected during execution by the second controlled execution tool of the second sequence of instructions.

43. The computer-readable medium of claim 40, wherein the instructions for exchanging data with the second controlled execution tool further comprise instructions which, when executed by one or more processors, cause the one or more processors to carry out the step of:
receiving data from the second controlled execution tool, wherein the data describes execution of the second sequence of instructions by the second controlled execution tool.

44. The computer-readable medium of claim 43, wherein the data specifies a break event that was detected during execution by the second controlled execution tool of the second sequence of instructions.

45. The computer-readable medium of claim 39, wherein:
the first controlled execution tool is selected from the group consisting of a first debugger, a first tracing application, and a first profiler application; and
the second controlled execution tool is selected from the group consisting of a second debugger, a second tracing application, and a second profiler application.

46. The computer-readable medium of claim 39, wherein:
the first controlled execution tool executes the first sequence of instructions in a mode selected from the group consisting of controlled execution mode and free running mode;
controlled execution mode allows for use of one or more break points while the first controlled execution tool executes the first sequence of instructions; and
free running mode does not allow the use of one or more break points while the first controlled execution tool executes the first sequence of instructions.

47. The computer-readable medium of claim 39, wherein the first sequence of instructions is platform independent code.

48. The computer-readable medium of claim 39, wherein the first sequence of instructions is platform specific code that is designed for execution on a platform upon which the first controlled execution tool executes the first sequence of instructions.

49. The computer-readable medium of claim 39, wherein the first sequence of instructions is code that is selected from the group consisting of source code, object code, and executable code.

50. The computer-readable medium of claim 39, wherein:
the first controlled execution tool executes the first sequence of instructions in a first operating environment; and
the second controlled execution tool executes the second sequence of instructions in a second operating environment that is different than the first operating environment.

51. The computer-readable medium of claim 39, further comprising instructions which, when executed by the one or more processors, cause the one or more processors to carry out the step of:
receiving input from a user through a user interface, wherein the input is used by the first controlled execution tool when executing the first sequence of instructions and by the second controlled execution tool when executing the second sequence of instructions.

52. The computer-readable medium of claim 39, further comprising instructions which, when executed by the one or more processors, cause the one or more processors to carry out the step of:
providing information to a user about the execution of the first sequence of instructions by the first controlled execution tool and about the execution of the second sequence of instructions by the second controlled execution tool.

53. The computer-readable medium of claim 39, wherein the call is a remote procedure call.

54. The computer-readable medium of claim 39, further comprising instructions which, when executed by the one or more processors, cause the one or more processors to carry out the steps of:
while the second controlled execution tool executes the second sequence of instructions, detecting an additional call from the second sequence of instructions to a third sequence of instructions of a third program; and
in response to the additional call, automatically causing the third sequence of instructions to be executed by a third controlled execution tool.

55. The computer-readable medium of claim 39, further comprising instructions which, when executed by the one or more processors, cause the one or more processors to carry out the steps of:
prior to the first application executing the first sequence of instructions, instantiating a data structure;
the first controlled execution tool using the data structure when the first controlled execution tool executes the first sequence of instructions; and
the second controlled execution tool using the data structure when the second controlled execution tool executes the second sequence of instructions.

56. The computer-readable medium of claim 39, wherein the first controlled execution tool includes an execution object that executes the first sequence of instructions.

57. The computer-readable medium of claim 56, further comprising instructions which, when executed by the one or more processors, cause the one or more processors to carry out the step of:
the execution object controlling execution of the first sequence of instructions.

58. The computer-readable medium of claim 57, wherein the instructions for the execution object controlling execution of the first sequence of instructions further comprise instructions which, when executed by one or more processors, cause the one or more processors to carry out the step of:
the execution object functioning as a programming language subsystem.

59. The computer-readable medium of claim 56, wherein the execution object comprises a command unit, an execution unit, and a call unit, and further comprising instructions which, when executed by the one or more processors, cause the one or more processors to carry out the steps of:
the command unit receiving a command to execute the first sequence of instructions;
the execution unit interpreting the first sequence of instructions for execution by a processor until a condition is detected; and
the call unit that initiating a call when the condition is detected.

60. The computer-readable medium of claim 59, wherein the condition is encountering an instruction to perform a remote procedure call.

61. The computer-readable medium of claim 59, wherein the condition is encountering a position within the first sequence of instructions that is associated with a break event.

62. The computer-readable medium of claim 59, wherein in response to detecting the condition, the first controlled execution tool halts execution of the first sequence of instructions.

63. The computer-readable medium of claim 62, wherein in response to detecting an additional condition, the first controlled execution tool resumes execution of the first sequence of instructions.

64. The computer-readable medium of claim 59, wherein in response to detecting the condition, the first controlled execution continues execution of the first sequence of instructions to monitor execution of the second sequence of instructions by the second application.

65. The computer-readable medium of claim 39, wherein the second controlled execution tool includes an execution object that executes the second sequence of instructions.

66. The computer-readable medium of claim 65, further comprising instructions which, when executed by the one or more processors, cause the one or more processors to carry out the step of:
the execution object controlling execution of the second sequence of instructions.

67. The computer-readable medium of claim 66, wherein the instructions for the execution object controlling execution of the second sequence of instructions further comprise instructions which, when executed by one or more processors, cause the one or more processors to carry out the step of:

the execution object functioning as a programming language subsystem.

68. The computer-readable medium of claim 65, wherein the execution object comprises a command unit, an execution unit, and a call unit, and further comprising instructions which, when executed by the one or more processors, cause the one or more processors to carry out the steps of:

the command unit receiving a command to execute the second sequence of instructions;

the execution unit interpreting the second sequence of instructions for execution by a processor until a condition is detected; and the call unit that initiating a call when the condition is detected.

69. The computer-readable medium of claim 68, wherein the condition is encountering an instruction to perform a remote procedure call.

70. The computer-readable medium of claim 68, wherein the condition is encountering a position within the second sequence of instructions that is associated with a break event.

71. The computer-readable medium of claim 68, further comprising instructions which, when executed by the one or more processors, cause the one or more processors to carry out the steps of:

receiving information about the execution of the second sequence of instructions when the condition is detected.

72. A computer-readable medium carrying one or more sequences of instructions for debugging an application, wherein execution of the one or more sequences of instructions by one or more processors causes the one or more processors to perform the steps of:

while debugging a first sequence of instructions with a first debugging application, detecting a call from the first sequence of instructions of a first program to a second sequence of instructions of a second program;

in response to the call, automatically causing the second sequence of instructions to be debugged by a second debugging application.

73. The computer-readable medium of claim 72, wherein the call is a remote procedure call.

74. The computer-readable medium of claim 72, wherein the instructions for debugging the first sequence of instructions further comprise instructions which, when executed by one or more processors, cause the one or more processors to carry out the step of using an execution object that functions as a programming language subsystem to control execution of the first sequence of instructions.

75. The computer-readable medium of claim 72, wherein the instructions for debugging the second sequence of instructions further comprise instructions which, when executed by one or more processors, cause the one or more processors to carry out the step of using an execution object that functions as a programming language subsystem to control execution of the second sequence of instructions.

76. A system for controlling the execution of two or more sequences of instructions by different applications, comprising:

a first controlled execution tool that executes a first sequence of instructions of a first program;

a second controlled execution tool that executes a second sequence of instructions of a second program;

wherein the first controlled execution tool is configured to detect a call from the first sequence of instructions to the second sequence of instructions; and wherein in response to the call, the second controlled execution tool is configured to automatically execute the second sequence of instructions.

* * * * *

UNITED STATES PATENT AND TRADEMARK OFFICE
CERTIFICATE OF CORRECTION

PATENT NO. : 6,988,262 B1
DATED : January 17, 2006
INVENTOR(S) : James Mallory et al.

It is certified that error appears in the above-identified patent and that said Letters Patent is hereby corrected as shown below:

Column 24,
Line 23, delete "second-controlled" and insert -- second controlled --.

Column 30,
Line 2, delete "second program;" and insert -- second program; and --.

Signed and Sealed this

Eleventh Day of April, 2006

JON W. DUDAS
*Director of the United States Patent and Trademark Office*